US012566392B2

(12) United States Patent
Narita

(10) Patent No.: US 12,566,392 B2
(45) Date of Patent: Mar. 3, 2026

(54) BELT CONVEYANCE DEVICE AND IMAGE FORMING APPARATUS

(71) Applicant: CANON KABUSHIKI KAISHA, Tokyo (JP)

(72) Inventor: Kazuyuki Narita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/913,753

(22) Filed: Oct. 11, 2024

(65) Prior Publication Data

US 2025/0164910 A1 May 22, 2025

(30) Foreign Application Priority Data

Nov. 18, 2023 (JP) ................................ 2023-196322

(51) Int. Cl.
*G03G 15/16* (2006.01)
*G03G 21/16* (2006.01)

(52) U.S. Cl.
CPC ....... *G03G 15/1615* (2013.01); *G03G 21/168* (2013.01)

(58) Field of Classification Search
CPC ............. G03G 15/1615; G03G 15/161; G03G 21/1647; G03G 21/168; G03G 2215/0132
See application file for complete search history.

(56) References Cited

U.S. PATENT DOCUMENTS

2014/0174888 A1* 6/2014 Koshida ................. G03G 15/00 198/497
2015/0168879 A1* 6/2015 Mori .................. G03G 15/1615 399/121
2016/0187841 A1* 6/2016 Hatano ............. G03G 15/1615 399/121
2022/0081238 A1* 3/2022 Nakajima .......... G03G 15/1615

FOREIGN PATENT DOCUMENTS

JP 2015-118114 6/2015
JP 2015-165263 9/2015
JP 2022-049617 3/2022

* cited by examiner

*Primary Examiner* — Jessica L Eley
(74) *Attorney, Agent, or Firm* — Venable LLP

(57) ABSTRACT

A belt unit dismountably mounted on a main assembly includes an endless belt, a tension mechanism, a tension releasing member and contacting portion. The tension mechanism includes a tension roller applying the tension to the belt by stretching the belt and movably provided between a first position where the tension is applied to the belt and a second position where the tension is released and an urging member urging the tension roller. The tension releasing member restricts movement of the tension roller from the second position to the first position and permits the movement by engagement with the tension mechanism being released. The contacting portion provided on the tension releasing member prevents the belt unit from being mounted on the main assembly when the belt unit is to be mounted in a state in which the tension releasing member is engaged with the tension mechanism.

16 Claims, 15 Drawing Sheets

(a)

(b)

BELT CONVEYANCE DEVICE AND IMAGE FORMING APPARATUS

FIELD OF THE INVENTION AND RELATED ART

The present invention relates to a belt conveyance device used in an image forming apparatus such as a copy machine, a printer and a facsimile machine using an electrophotographic type or an electrostatic recording type, and to an image forming apparatus provided with the belt conveyance device.

Conventionally, for example, in the image forming apparatus using the electrophotographic type, such as the copy machine, the belt conveyance device provided with an endless belt (hereinafter simply referred to as a "belt") stretched over a plurality of stretching rollers is used. The belt is used as a conveyance member which carries and conveys a toner image or carries and conveys a recording material onto which the toner image is formed. Examples of the conveyance member which carries and conveys the toner image include a photosensitive belt, which is a belt-shaped photosensitive member, and an intermediary transfer belt, which is an intermediary transfer member carrying to transfer the toner image transferred from the photosensitive member to the recording material. In addition, examples of the conveyance member which carries and conveys the recording material onto which the toner image is formed include a conveyance belt, which is a recording material carrying member conveying the recording material onto which the toner image is transferred from the photosensitive member. Hereinafter, the image forming apparatus of the electrophotographic type provided with the intermediary transfer belt will be mainly described as an example.

The intermediary transfer belt wears out (e.g., fluctuation of electric resistance value, deterioration of surface, etc.) with uses of the image forming apparatus. And, in general, a life of the intermediary transfer belt is shorter than that of an apparatus main assembly of the image forming apparatus. Therefore, an intermediary transfer unit, which is a unit including the intermediary transfer belt, may be dealt as, for example, a consumable part which is replaced periodically by a user or a service engineer.

The intermediary transfer belt is constituted by, for example, an endless belt which has a thickness of about 50 to 100 μm and is formed using resin such as PI (polyimide), PVDF (polyvinylidene fluoride), PET (polyethylene terephthalate), PC (polycarbonate) and PEEK (polyetheretherketone). In addition, in the intermediary transfer unit, a tension applied to the intermediary transfer belt tends to be increased to achieve higher image quality, higher speed and to deal with various types of the recording material in recent years. And if the tension is left applied to the intermediary transfer belt for a long period of time, the intermediary transfer belt may have creep deformation along shapes of the stretching rollers which stretch the intermediary transfer belt, causing a mark called "curling", etc. (deformation to occur). Once the curling occurs in the intermediary transfer belt, transfer defect of the toner image may occur in a primary transfer portion or a secondary transfer portion, causing the image quality on the recording material, which is a product, to deteriorate.

Therefore, it is desirable to loosen the tension of the intermediary transfer belt in a packed state of the intermediary transfer unit so that the intermediary transfer belt does not have the curling.

In Japanese Patent Application Laid-Open No. 2022-49617, a mechanism to loosen the tension of the intermediary transfer belt is proposed.

In a case in which, however, the intermediary transfer unit is shipped with the tension of the intermediary transfer belt being loosened by using a member for loosening the tension of the intermediary transfer belt, there is the following problem.

That is, it can be assumed that when the user or the service engineer replaces the intermediary transfer unit, which is a consumable part, they forget to remove the member for loosening the tension of the intermediary transfer belt, and the intermediary transfer unit is mounted on the apparatus main assembly of the image forming apparatus. If the intermediary transfer unit is mounted on the apparatus main assembly of the image forming apparatus with the tension of the intermediary transfer belt being loosened, problems such that a driving roller of the intermediary transfer belt cannot convey the intermediary transfer belt in a rotational direction of the intermediary transfer belt may occur.

SUMMARY OF THE INVENTION

Therefore, an object of the present invention is to prevent a belt conveyance device from being mounted on an apparatus main assembly of an image forming apparatus with forgetting to release a state in which a tension of a belt is loosened.

The above object is achieved with a belt conveyance device and an image forming apparatus according to the present invention. In summary, according to an aspect of the present invention, there is provided an image forming apparatus comprising: an image forming portion configured to form an image; a belt unit dismountably mounted on a main assembly of the image forming apparatus, wherein the belt unit includes: an endless belt to which a toner image formed in the image forming portion is transferred; a tension mechanism capable of applying a tension to the belt and including a tension roller configured to apply the tension to the belt by stretching the belt and movably provided between a first position where the tension is applied to the belt and a second position where the tension of the belt is released or the tension of the belt is loosened more than when the tension roller is positioned in the first position, and an urging member configured to urge the tension roller; an engaged portion provided on the tension mechanism and configured to be engaged with a tension releasing member configured to restrict movement of the tension roller from the second position to the first position, wherein the tension releasing member permits the movement of the tension roller from the second position to the first position by engagement with the tension mechanism being released; and a contacted portion provided on the main assembly of the image forming apparatus and configured to prevent the belt unit from being mounted by the tension releasing member being contacted when the belt unit is to be mounted in a state in which the tension releasing member is engaged with the tension mechanism.

Further features of the present invention will become apparent from the following description of exemplary embodiments with reference to the attached drawings.

DESCRIPTION OF THE EMBODIMENTS

Hereinafter, a belt conveyance device and an image forming apparatus according to the present invention will be described in more detail in accordance with the drawings.

Embodiment 1

1. General Structure and Operation of an Image Forming Apparatus

Figure 1:
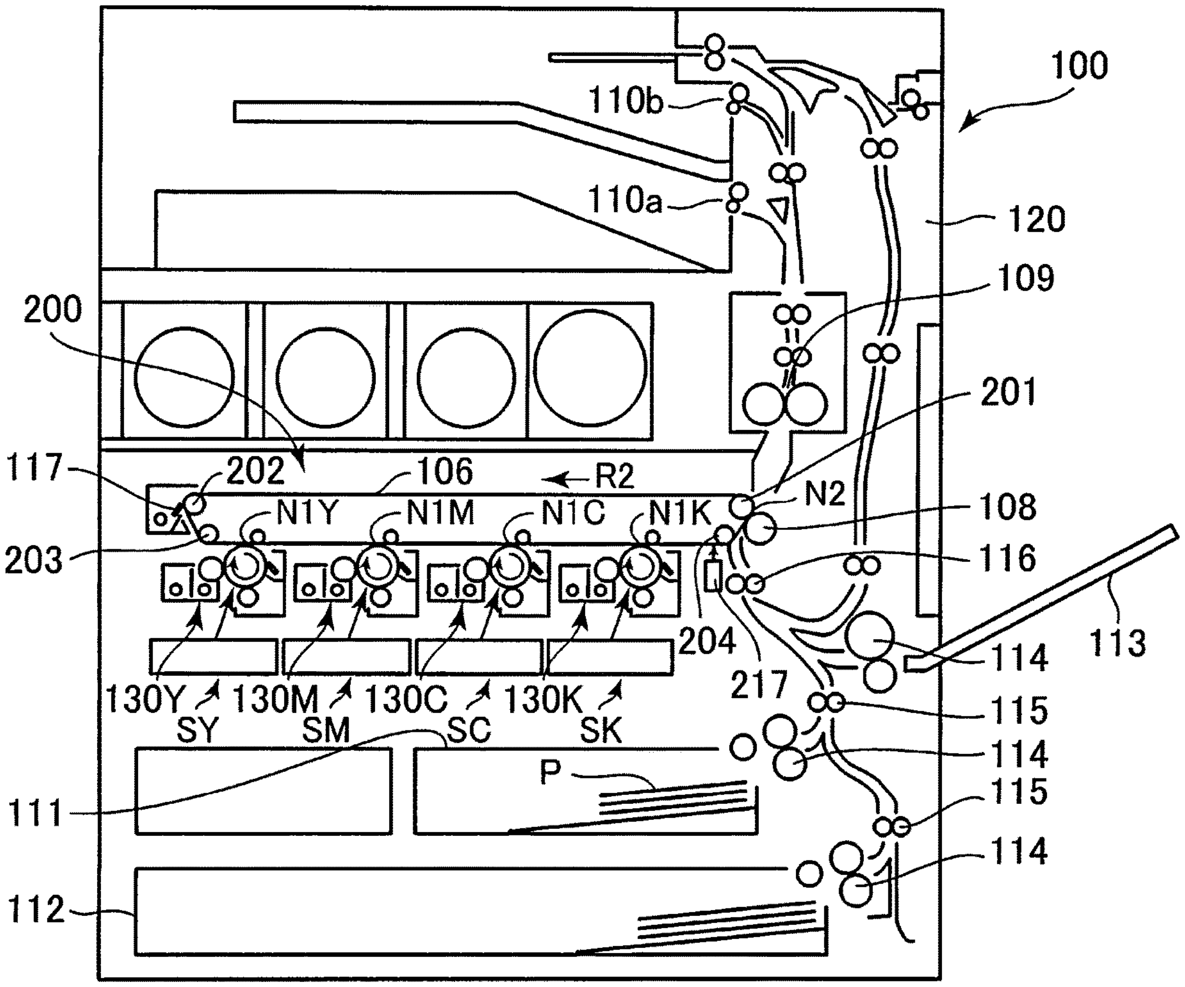
FIG. 1 is a schematic cross-sectional view of an image forming apparatus.

FIG. 1 is a schematic cross-sectional view of an image forming apparatus in the present Embodiment (illustrating a cross-sectional view substantially perpendicular to a rotational axis direction of a photosensitive drum 101, which will be described below). An image forming apparatus 100 of the present Embodiment is a color digital printer of tandem-type employing an intermediary transfer type, which is capable of forming a full-color image using an electrophotographic type.

Figure 2:
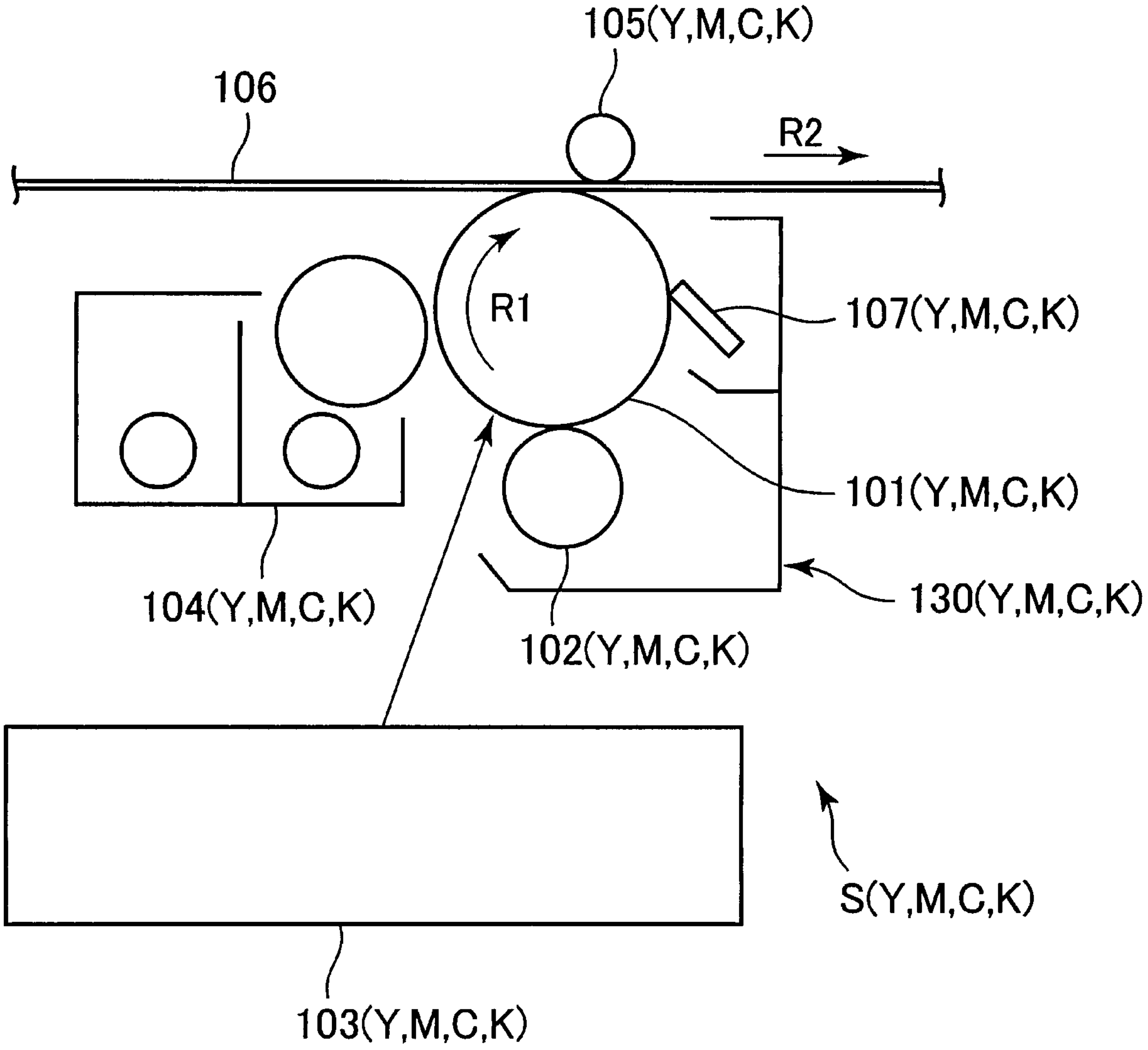
FIG. 2 is a schematic cross-sectional view of an image forming portion.

The image forming apparatus 100 is provided with a first, a second, a third and a fourth image forming portions SY, SM, SC and SK, which form images of yellow (Y), magenta (M), cyan (C) and black (K), respectively, as a plurality of image forming portions (stations). Incidentally, elements having the same or corresponding functions or configurations, which are provided for each color, may be described collectively by omitting ends of the reference numerals of Y, M, C and K, which indicate that the element is provided for one of the colors. FIG. 2 is a schematic cross-sectional view illustrating one image forming portion S representatively. In the present Embodiment, the image forming portion S is provided with a photosensitive drum 101 (101Y, 101M, 101C and 101K), a charging roller 102 (102Y, 102M, 102C and 102K), an exposure device 103 (103Y, 103M, 103C and 103K), a developing device 104 (104Y, 104M, 104C and 104K), and a drum cleaning device 107 (107Y, 107M, 107C and 107K), etc., which will be described below.

The photosensitive drum 101, which is a drum-shaped (cylindrical) photosensitive member (electrophotographic photosensitive member) as an image bearing member, is rotationally driven in a direction of an arrow R1 (clockwise direction) in FIG. 2. A rotatable surface of the photosensitive drum 101 is substantially uniformly charged to predetermined potential of predetermined polarity (negative polarity in the present Embodiment) by the charging roller 102, which is a roller-shaped charging member as a charging means. The charged surface of the photosensitive drum 101 is scanned and exposed by the exposure device (laser scanner) 103 as an exposure means in accordance with an image signal, and an electrostatic latent image (electrostatic image) corresponding to the image signal is formed on the photosensitive drum 101. To the exposure device 103, the image signal of a color component corresponding to each image forming portion S is input, and according to this image signal, the exposure device 103 irradiates a laser beam onto the surface of the photosensitive drum 101 to neutralize electric charge on the photosensitive drum 101 and form the electrostatic latent image on the photosensitive drum 101. The electrostatic latent image formed on the photosensitive drum 101 is developed (visualized) by toner as a developer being supplied by the developing device 104 as a developing means, and a toner image (toner figure, developer image) is formed on the photosensitive drum 101. In the present Embodiment, the toner charged to the same polarity as the charging polarity of the photosensitive drum 101 (negative polarity in the present Embodiment) is adhered to an exposed portion (image portion) on the photosensitive drum 101 where an absolute value of the potential has decreased by being exposed after uniformly charged (reverse development method). In the present Embodiment, normal charging polarity of the toner, which is main charging polarity of the toner during the development, is the negative polarity.

An intermediary transfer belt 106, which is constituted by an endless belt as an intermediary transfer member, is disposed so as to face the four photosensitive drums 101Y, 101M, 101C and 101K. The intermediary transfer belt 106 is stretched over a plurality of stretching rollers 201, 202, 203 and 204. The intermediary transfer belt 106 is rotated (turned around) in a direction of an arrow R2 (counterclockwise direction) in the figures by driving force being transmitted by a driving roller 201, which is one of the plurality of the stretching rollers 201 through 204, being rotationally driven. On an inner circumferential surface side of the intermediary transfer belt 106, primary transfer rollers 105Y, 105M, 105C and 105K, which are roller-shaped primary transfer members as primary transfer means, are disposed corresponding to the four photosensitive drums 101Y, 101M, 101C and 101K, respectively. The primary transfer roller 105 is urged in a direction pressing the intermediary transfer belt 106 toward the photosensitive drum 101 to form a primary transfer portion (primary transfer nip) N1 in which the photosensitive drum 101 and the intermediary transfer belt 106 are in contact with each other. The stretching rollers other than the driving roller 201 and each primary transfer roller 105 are rotated following the rotation of the intermediary transfer belt 106. The toner image formed on the photosensitive drum 101 is electrostatically transferred (primary transfer) onto the rotating intermediary transfer belt 106 as a transferred member by an action of the primary transfer roller 105 in the primary transfer portion N1. During the primary transfer, to the primary transfer roller 105, primary transfer voltage (primary transfer bias) having reverse polarity to the normal charging polarity of the toner (positive polarity in the present Embodiment) is applied. For example, during a full-color image formation, the toner images of each color of yellow, magenta, cyan and black formed on each photosensitive drum 101 are transferred sequentially so as to be overlapped on the intermediary transfer belt 106 in each primary transfer portion N1. As a result, a multi-layered toner image for the full-color image is formed on the intermediary transfer belt 106.

On an outer peripheral surface side of the intermediary transfer belt 106, a secondary transfer roller 108, which is a roller-shaped secondary transfer member as a secondary transfer means, is disposed in a position opposite to the driving roller 201. The secondary transfer roller 108 is urged toward the driving roller 201 and is in contact with the driving roller 201 via the intermediary transfer belt 106 to form a secondary transfer portion (secondary transfer nip) N2, in which the intermediary transfer belt 106 and the secondary transfer roller 108 are in contact with each other. The secondary transfer roller 108 is rotated following the rotation of the intermediary transfer belt 106. The toner image on the intermediary transfer belt 106 is electrostatically transferred (secondary transfer) onto a recording material P as a transferred member, which is nipped and conveyed between the intermediary transfer belt 106 and the secondary transfer roller 108, by an action of the secondary transfer roller 108 in the secondary transfer portion N2. During the secondary transfer, to the secondary transfer roller 108, secondary transfer voltage (secondary transfer bias) having the reverse polarity to the normal charging polarity of the toner (positive polarity in the present Embodiment) is applied. The driving roller 201 is connected to ground potential (electrically grounded). Incidentally, the secondary transfer roller 108 may be configured to be rotationally driven. In addition, secondary transfer voltage of the same polarity as the normal charging polarity of the toner may be applied to an inner roller, which corresponds to the driving roller 201 in the present Embodiment, and an outer roller, which corresponds to the secondary transfer roller 108 in the present Embodiment, may be electrically grounded. The recording material (transfer material, recording medium, media, sheet) P, such as a paper, is fed from one of cassettes 111 and 112 and a manual feed tray 113 as feeding portions, by a feeding roller 114 as a feeding member. The recording material P is conveyed by conveyance rollers 115, etc. as conveyance members to a registration roller 116 as a synchronizing conveyance member. A leading end of the recording material P then abuts on the stopped registration roller 116 and forms a loop. Rotation of the registration roller 116 is then started as timed with the toner image on the intermediary transfer belt 106, and the record material P is conveyed to the secondary transfer portion N2 by the registration roller 116.

The recording material P onto which the toner image has been transferred is conveyed to a fixing device 109 as a fixing means. The fixing device 109 applies heat and pressure to the recording material P carrying the unfixed toner image to fix (melt and solidly fix) the toner image on the recording material P. Thereafter, the recording material P, onto which the toner image is fixed, is discharged (output) from either of discharging portions 110*a* or 110*b* to an outside of an apparatus main assembly 120 of the image forming apparatus 100 (hereinafter simply referred to as an "apparatus main assembly") (outside the machine).

On the other hand, the toner remaining on the photosensitive drum 101 after the primary transfer process (primary transfer residual toner) is removed from the photosensitive drum 101 and collected by the drum cleaning device 107 as a photosensitive member cleaning means. In addition, adherent material such as the toner remaining on the intermediary transfer belt 106 after the secondary transfer process (secondary transfer residual toner) are removed from the intermediary transfer belt 106 and collected by a belt cleaning device 117 as an intermediary transfer member cleaning means.

Here, the image forming apparatus 100 is required to overlap the toner images of the plurality of colors, for example, upon forming the full-color image. Therefore, the image forming apparatus 100 performs color misalignment correcting control, as appropriate, to control an exposure timing of the exposure device 103 upon forming the images of each color. In the color misalignment correcting control, the toner images (registration patches) for the color misalignment correcting control for each color are formed on the intermediary transfer belt 106. The registration patches on the intermediary transfer belt 106 is then detected by a sensor unit 217 configured to include an optical sensor. The sensor unit 217 is provided to detect the toner images on the intermediary transfer belt 106 at a detecting position on the intermediary transfer belt 106 downstream of the primary transfer portion N (downstreammost primary transfer portion N1K) and upstream of the secondary transfer portion N2 in the rotational direction of the intermediary transfer belt 106 (moving direction of the surface thereof). In the present Embodiment, the sensor unit 217 is disposed opposite to the surface of the intermediary transfer belt 106 between the primary transfer portion N1K for black and a pre-secondary transfer roller 204, which will be described below, in the rotational direction of the intermediary transfer belt 106. In addition, the sensor unit 217 may be configured to include a density patch detecting sensor (optical sensor) which detects the toner image for image density correcting control (density patch) other than a registration patch detecting sensor (optical sensor) which detects the registration patch. One of the registration patch detecting sensor and the density patch detecting sensor may serve a function of the other as well instead of the other.

Incidentally, in the present Embodiment, each image forming portion SY, SM, SC and SK constitutes a toner image forming means which forms the toner image on the intermediary transfer belt 106.

In addition, in the present Embodiment, in each image forming portion S, the photosensitive drum 101 and the charging roller 102, the developing roller 104 and the drum cleaning device 107, which act thereon as process means, integrally constitute a process cartridge 130. Each process cartridge 130 (130Y, 130M, 130C and 130K) is configured to be mountable on and dismountable from the apparatus main assembly 120, respectively.

In addition, in the present Embodiment, the intermediary transfer belt 106, each stretching roller 201 through 204, each primary transfer roller 105Y, 105M, 105C and 105K, and the belt cleaning device 117, etc., integrally constitute an intermediary transfer unit 200 as a belt conveyance device. The intermediary transfer unit 200 is configured to be mountable on and dismountable from the apparatus main assembly 120.

2. Outline Configuration of the Intermediary Transfer Unit

Next, an outline configuration of the intermediary transfer unit 200 as the belt conveyance device in the present Embodiment will be described.

Here, with respect to the image forming apparatus 100 and elements thereof, a near side of a surface of a paper in FIG. 1 is defined as a "front side (front surface side)" and a back side of the surface of the paper is defined as a "rear side (back surface side)". This front-rear direction is substantially parallel to respective rotational axial directions of the photosensitive drum 101 and the stretching rollers 201 through 204 of the intermediary transfer belt 106. In other words, a widthwise direction, which is substantially perpendicular to the moving direction of the surface of the intermediary transfer belt 106, is substantially parallel to the respective rotational axis directions of the photosensitive drum 101 and the stretching rollers 201 through 204 of the intermediary transfer belt 106. In addition, with respect to the image forming apparatus 100 and the elements thereof, a right side and a left side of the image forming apparatus 100 as viewed from the front side are defined as a "right side" and a "left side", respectively. In addition, with respect to the image forming apparatus 100 and the elements thereof, an up-down direction refers to an up-down direction in the gravity direction (vertical direction), however, each direction does not mean only directly above or directly below, but include upside or downside of a horizontal plane passing through a position or an element of interest. In addition, positions and positional relationship with respect to the image forming apparatus 100 and the elements thereof are those in a case in which the image forming apparatus 100 is positioned in a normally used posture.

The intermediary transfer unit 200 is provided with the intermediary transfer belt 106 as the intermediary transfer member. In the present Embodiment, the intermediary transfer belt 106 is constituted by the endless belt (film) formed using PI (polyimide). Incidentally, the material which constitutes the intermediary transfer belt 106 is not limited to PI (polyimide), but, for example, resin such as PVDF (polyvinylidene fluoride), PET (polyethylene terephthalate), PC (polycarbonate) may be used.

The intermediary transfer belt 106 is stretched over four stretching rollers: the driving roller 201, a tension roller 202, a pre-primary transfer roller 203 and the pre-secondary transfer roller 204. Each stretching roller will be described.

Figure 5:
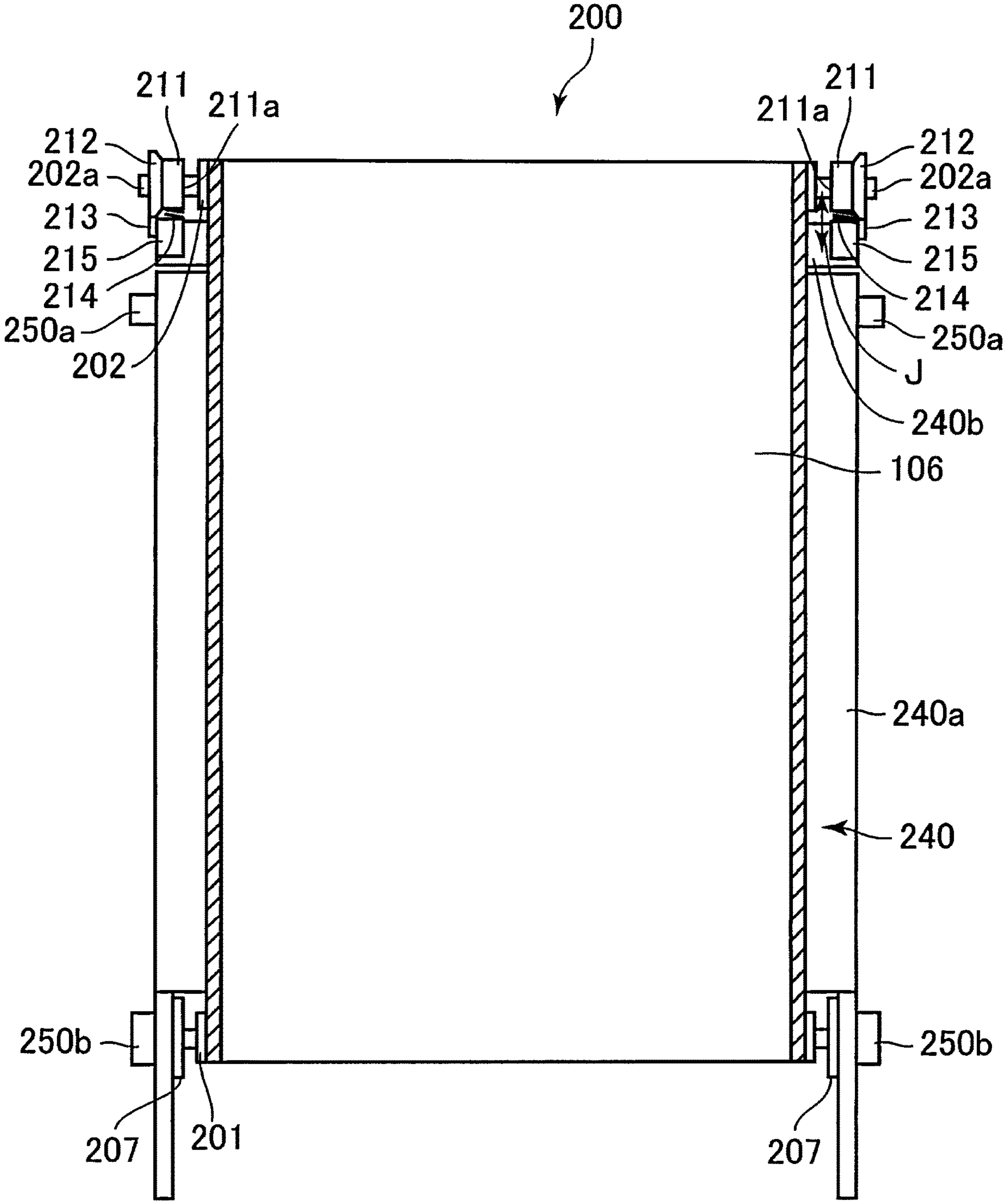
FIG. 5 is a schematic plan view of the intermediary transfer unit as viewed from above.

The driving roller 201, which is a first stretching roller, is an opposing roller as an opposing member (opposing electrode) to the secondary transfer roller 108, and also serves to rotate (convey) the intermediary transfer belt 106. The driving roller 201 is rotationally driven by driving force transmitted from a belt driving motor (not shown) as a driving source provided to the apparatus main assembly 120. A surface of the driving roller 201 is formed of a rubber layer having high coefficient of friction to convey the intermediary transfer belt 106 without slipping. The driving roller 201 is rotatably supported by a first frame 240*a* (FIG. 5), which constitutes a frame 240 (FIG. 5) of the intermediary transfer unit 200, at both end portions in the rotational axis direction thereof via a bearing member 207 (FIG. 5).

The tension roller 202, which is a second stretching roller, is positioned adjacent to the driving roller 201 and on a downstream side of the driving roller 201 in the rotational direction of the intermediary transfer belt 106. The tension roller 202 is rotated following the rotation of the intermediary transfer belt 106. The tension roller 202 serves to apply tension (tensile force) to the intermediary transfer belt 106. In addition, in the present Embodiment, the tension roller 202 serves as an opposing roller to the belt cleaning device 117, which collects the transfer residual toner on the intermediary transfer belt 106, the toner images for various adjustment sequences (the registration patch and the density patch), etc., and as a steering roller, which corrects a shift (deviation) of the intermediary transfer belt 106. The tension roller 202 is rotatably supported by a second frame 240*b* (FIG. 5), which constitutes the frame 240 (FIG. 5) of the intermediary transfer unit 200, at both end portions in the rotational axis direction thereof via a bearing member 212 (FIG. 5). As described below, the second frame 240*b* is swingably mounted on the first frame 240*a*. In addition, as described below, the bearing member 212 of the tension roller 202 is movably mounted on the second frame 240*b*.

Figure 3:
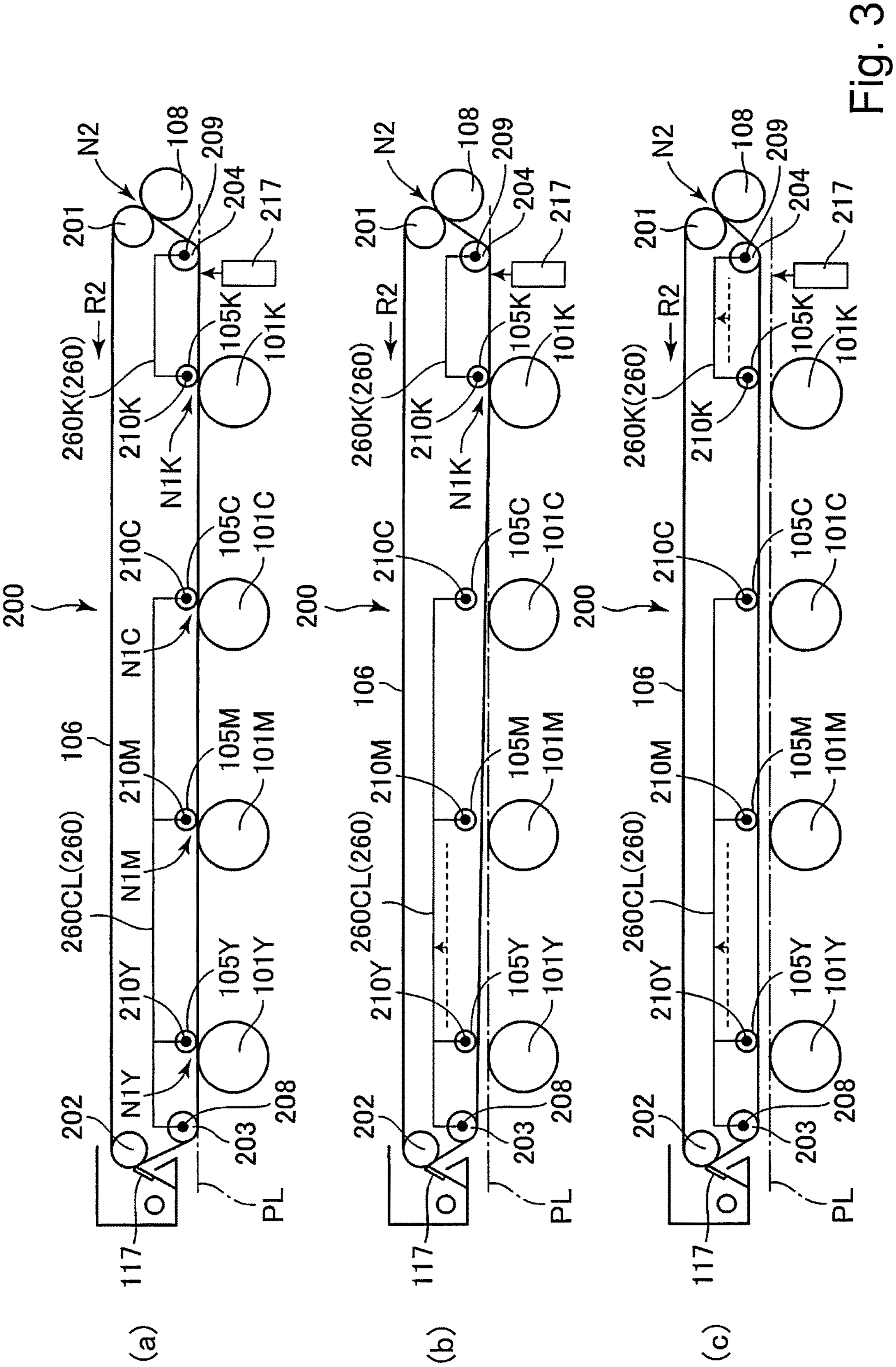
FIG. 3, part (a), part (b) and part (c), is a schematic cross-sectional view of an intermediary transfer unit.

The pre-primary transfer roller 203, which is a third stretching roller, is positioned adjacent to the tension roller 202 and on a downstream side of the tension roller 202 in the rotational direction of the intermediary transfer belt 106. The pre-primary transfer roller 203 is rotated following the rotation of the intermediary transfer belt 106. In the cross-section shown in FIG. 1 (cross-section perpendicular to the rotational axis direction of the photosensitive drum 101), a position of a lower surface (outer peripheral surface) of the intermediary transfer belt 106 directly below the pre-primary transfer roller 203 is substantially the same as a position of a common tangent line of the plurality of the photosensitive drums 101 on the intermediary transfer belt 106 side in the vertical direction. By this, the pre-primary transfer roller 203 stabilizes a position of a primary transfer surface, which is the surface of the intermediary transfer belt 106 to which the toner image is transferred from the photosensitive drum 101. The pre-primary transfer roller 203 is rotatably supported by the first frame 240*a* (FIG. 5), which constitutes the frame 240 (FIG. 5) of the intermediary transfer unit 200, at both end portions in the rotational axis direction thereof via a bearing member 208 (FIG. 3). As described below, the bearing member 208 of the pre-primary transfer roller 203 is movably mounted on the first frame 240*a*.

In addition, the pre-secondary transfer roller 204, which is a fourth stretching roller, is positioned adjacent to the pre-primary transfer roller 203 and on a downstream side of the pre-primary transfer roller 203 in the rotational direction of the intermediary transfer belt 106. The pre-secondary transfer roller 204 is rotated following the rotation of the intermediary transfer belt 106. In the cross-section shown in FIG. 1, a position of the lower surface (outer peripheral surface) of the intermediary transfer belt 106 directly below the pre-secondary transfer roller 204 is substantially the same as the common tangent line of the plurality of the photosensitive drums 101 on the intermediary transfer belt 106 side in the vertical direction. By this, the pre-secondary transfer roller 204 stabilizes the position of the primary transfer surface. In addition, the pre-secondary transfer roller 204 has a crown shape, in which an outer diameter of a central portion in the widthwise direction of the intermediary transfer belt 106 is larger than outer diameters of both end portions.

By this, the pre-secondary transfer roller 204 stretches a secondary transfer surface, which is a surface of the intermediary transfer belt 106 immediately before the secondary transfer portion N2, and stabilizes the secondary transfer surface. The pre-secondary transfer roller 204 is rotatably supported by the first frame 240*a* (FIG. 5), which constitutes the frame 240 (FIG. 5) of the intermediary transfer unit 200, at both end portions in the rotational axis direction thereof via a bearing member 209 (FIG. 3). As described below, the bearing member 209 of the pre-secondary transfer roller 204 is movably mounted on the first frame 240*a*.

In addition, the intermediary transfer unit 200 is provided with the primary transfer rollers 105Y, 105M, 105C and 105K provided correspondingly for each of the photosensitive drums 101Y, 101M, 101C and 101K. The primary transfer rollers 105Y, 105M, 105C and 105K are disposed between the pre-primary transfer roller 203 and the pre-secondary transfer roller 204 in the rotational direction of the intermediary transfer belt 106. Each primary transfer roller 105 is rotatably supported by the first frame 240*a*, which constitutes the frame 240 (FIG. 5) of the intermediary transfer unit 200, at both end portions in the rotational axis direction thereof via a bearing member 210. As described below, the bearing member 210 of each primary transfer roller 105 is movably mounted on the first frame 240*a*. The bearing member 210 of each primary transfer roller 105 is urged in a direction toward the photosensitive drum 101 by a primary transfer spring (not shown), which is an urging member (elastic member) as an urging means. In the present Embodiment, the primary transfer spring is constituted by a compression coil spring and is disposed between the first frame 240*a* and the bearing member 210. Each primary transfer roller 105 presses the intermediary transfer belt 106 toward the corresponding photosensitive drum 101 to form the primary transfer portion N1.

Furthermore, the intermediary transfer unit 200 is provided with the belt cleaning device 117 in a position opposite to the tension roller 202 via the intermediary transfer belt 106. In the present Embodiment, the belt cleaning device 117 is positioned by a rotation shaft 202*a* (FIG. 5) of the tension roller 202 and mounted on the second frame 240*b* (FIG. 5), which constitutes the frame 240 (FIG. 5).

Incidentally, in the present Embodiment, the four photosensitive drums 101Y, 101M, 101C and 101K are arranged in substantially a straight line along the moving direction of the surface of the intermediary transfer belt 106. In the present Embodiment, an arranging direction of the four photosensitive drums 101Y, 101M, 101C and 101K is substantially a horizontal direction. More specifically, in the present Embodiment, in the cross-sectional view shown in FIG. 1, the common tangent line of the four photosensitive drums 101Y, 101M, 101C and 101K on the intermediary transfer belt 106 side is substantially horizontal. That is, in the present Embodiment, a common tangent plane of the plurality of the photosensitive drums 101 on the intermediary transfer belt 106 side (here also referred to as a "photosensitive member tangent plane") is substantially horizontal.

3. Contacting/Separating Mechanism

Next, a contacting/separating mechanism (moving mechanism), which changes stretching modes of the intermediary transfer belt 106, in the present Embodiment will be described. Part (a), part (b) and part (c) of FIG. 3 illustrate schematic cross-sectional views of the intermediary transfer unit 200 for describing the stretching modes of the intermediary transfer belt 106 in the present Embodiment (illustrating cross-sectional views substantially perpendicular to the rotational axis direction of the photosensitive drum 101). Part (a), part (b) and part (c) of FIG. 3 illustrate an all contacting state, a black contacting state and an all separated state, respectively, as described below. Incidentally, part (a), part (b) and part (c) of FIG. 3 also illustrate the photosensitive drum 101, the secondary transfer roller 108 and the sensor unit 217.

The intermediary transfer unit 200 is provided with the bearing member 208, which rotatably supports the pre-primary transfer roller 203, and the bearing member 209, which rotatably supports the pre-secondary transfer roller 204. In addition, the intermediary transfer unit 200 is provided with the bearing members 210 (210Y, 210M, 210C and 210K), which rotatably support each primary transfer roller 105. The bearing members 208, 209 and 210 are movably mounted on the first frame 240*a* (FIG. 5) so that each roller is movable in an approaching direction and a separating direction with respect to a photosensitive member tangent plane PL. In addition, the intermediary transfer unit 200 is provided with a first mechanism portion 260CL, which constitutes a contacting/separating mechanism 260 and moves the bearing members 208, 210Y, 210M and 210C. Furthermore, the intermediary transfer unit 200 is provided with a second mechanism portion 260K, which constitutes the contacting/separating mechanism 260 and moves the bearing members 209 and 210K. The first mechanism portion 260CL and the second mechanism portion 260K are operated by driving force being transmitted from a contacting/separating motor (not shown) as a driving source provided to the apparatus main assembly 120.

As shown in part (a) of FIG. 3, in a color mode, all primary transfer rollers 105Y, 105M, 105C and 105K, the pre-primary transfer roller 203 and the pre-secondary transfer roller 204 are arranged in a first position (contact position) close to the photosensitive member tangent plane PL. In other words, the bearing members 208, 209 and 210 are arranged by the first mechanism portion 260CL and the second mechanism portion 260K so that each roller is arranged in this manner. As a result, the stretching mode of the intermediary transfer belt 106 is set to the "all contacting state", in which the intermediary transfer belt 106 is in contact with all photosensitive drums 101Y, 101M, 101C and 101K.

As shown in part (b) of FIG. 3, in a monochrome mode, the primary transfer rollers 105Y, 105M and 105C for yellow, magenta and cyan and the pre-primary transfer roller 203 are arranged in a second position (separated position), which is further separated from the photosensitive member tangent plane PL than the first position, and the primary transfer roller 105K for black and the pre-secondary transfer roller 204 are arranged in the first position (contact position). In other words, the bearing members 208, 209 and 210 are arranged by the first mechanism portion 260CL and the second mechanism portion 260K so that each roller is arranged in this manner. As a result, the stretching mode of the intermediary transfer belt 106 is set to the "black contacting state", in which the intermediary transfer belt 106 is in contact only with the photosensitive drum 101K for black among the four photosensitive drums 101.

In addition, as shown in part (c) of FIG. 3, when the intermediary transfer unit 200 is mounted on and dismounted from the apparatus main assembly 120, all primary transfer rollers 105Y, 105M, 105C and 105K, the pre-primary transfer roller 203 and the pre-secondary transfer roller 204 are arranged in the second position (separated position). In other words, the bearing members 208, 209 and 210 are arranged by the first mechanism portion 260CL and the second mechanism portion 260K so that each roller is arranged in this manner. As a result, the stretching mode of the intermediary transfer belt 106 is set to the "all separated state", in which the intermediary transfer belt 106 is separated from all photosensitive drums 101Y, 101M, 101C and 101K.

The image forming apparatus 100 can perform the image formation with switching between the color mode, in which the full-color image formation can be performed, and the monochrome mode, in which a monochrome (black monochrome) image formation can be performed. The color mode and the monochrome mode can be switched, for example, to the color mode upon printing advertisements with many photographs and to the monochrome mode upon printing data constituted only by texts. This is, by not operating the image forming portions S of yellow, magenta and cyan, which are not used for the image formation during the monochrome mode, to suppress wear and tear on the photosensitive drum 101 and the developing device 104 of the image forming portions S. In a case, however, in which the rotation of the photosensitive drum 101 and the developing device 104 of the image forming portions S are simply stopped, the stopped photosensitive drum 101 and the rotating intermediary transfer belt 106 may be rubbed against each other and each may be damaged. Therefore, in the monochrome mode, the stretching mode of the intermediary transfer belt 106 is set to the black contacting state shown in part (b) of FIG. 3. Switching from the all contacting state shown in part (a) of FIG. 3 to the black contacting state shown in part (b) of FIG. 3 is performed by the primary transfer rollers 105Y, 105M and 105C and the pre-primary transfer roller 203 being moved above more than the all contacting state by the first mechanism portion 260CL. Conversely, switching from the black contacting state shown in part (b) of FIG. 3 to the all contacting state shown in part (a) of FIG. 3 is performed by the primary transfer rollers 105Y, 105M and 105C and the pre-primary transfer roller 203 being moved below more than the black contacting state by the first mechanism portion 260CL. The full color mode and the monochrome mode can be selected at a user's discretion. In addition, it is also possible for a control portion of the image forming apparatus 100 to automatically determine and select between the full color mode and the monochrome mode based on characteristics of image data sent from an external device such as a personal computer in response to user's operation to the image forming apparatus 100 (automatic change). In the automatic change, the following switching is performed for example, assuming a case in which the image data for a number of sheets of the recording material P include basically only documents but pictures as well only in images formed on few sheets of the recording material P in the middle of the process. In this case, printing is performed in the monochrome mode for the recording material P on which images only of the documents are formed, and in the color mode for the recording material P on which images including the pictures are formed (monochrome/color mixed printing).

In addition, in the present Embodiment, the intermediary transfer unit 200 is a consumable part and is replaced periodically, for example. As described below, upon replacing the intermediary transfer unit 200, the intermediary transfer unit 200 is pulled out from the apparatus main assembly 120 to the right side (FIG. 4) along the photosensitive member tangent plane PL. When the intermediary transfer unit 200 is pulled out from the apparatus main assembly 120, if the photosensitive drum 101 and the intermediary transfer belt 106 are in the state of being in contact with each other, the photosensitive drum 101 and the intermediary transfer belt 106 may be rubbed against each other and each may be damaged. Therefore, when the intermediary transfer unit 200 is mounted on and dismounted from the apparatus main assembly 120, the stretching mode of the intermediary transfer belt 106 is set to the all separated state shown in part (c) of FIG. 3. For example, switching from the black contacting state shown in part (b) of FIG. 3 to the all separated state shown in part (c) of FIG. 3 is performed by the primary transfer roller 105K and the pre-secondary transfer roller 204 being moved above more than the black contacting state by the second mechanism portion 260K. In addition, for example, switching from the all contacting state shown in part (a) of FIG. 3 to the all separated state shown in part (c) of FIG. 3 is performed by the primary transfer rollers 105Y, 105M, 105C and 105K, the pre-primary transfer roller 203 and the pre-secondary transfer roller 204 being moved above more than the all contacting state by the first mechanism portion 260CL and the second mechanism portion 260K. By this, the rubbing between the photosensitive drum 101 and the intermediary transfer belt 106 caused by the mounting and dismounting operation (pulling out operation and inserting operation) of the intermediary transfer unit 200 with respect to the apparatus main assembly 120. Switching from the all separated state shown in part (c) of FIG. 3 to the all contacting state shown in part (a) of FIG. 3 or the black contacting state shown part (b) in FIG. 3 is performed by each roller being moved below conversely to what described above by the first mechanism portion 260CL and the second mechanism portion 260K.

4. Mounting and Dismounting of the Intermediary Transfer Unit

Figure 4:
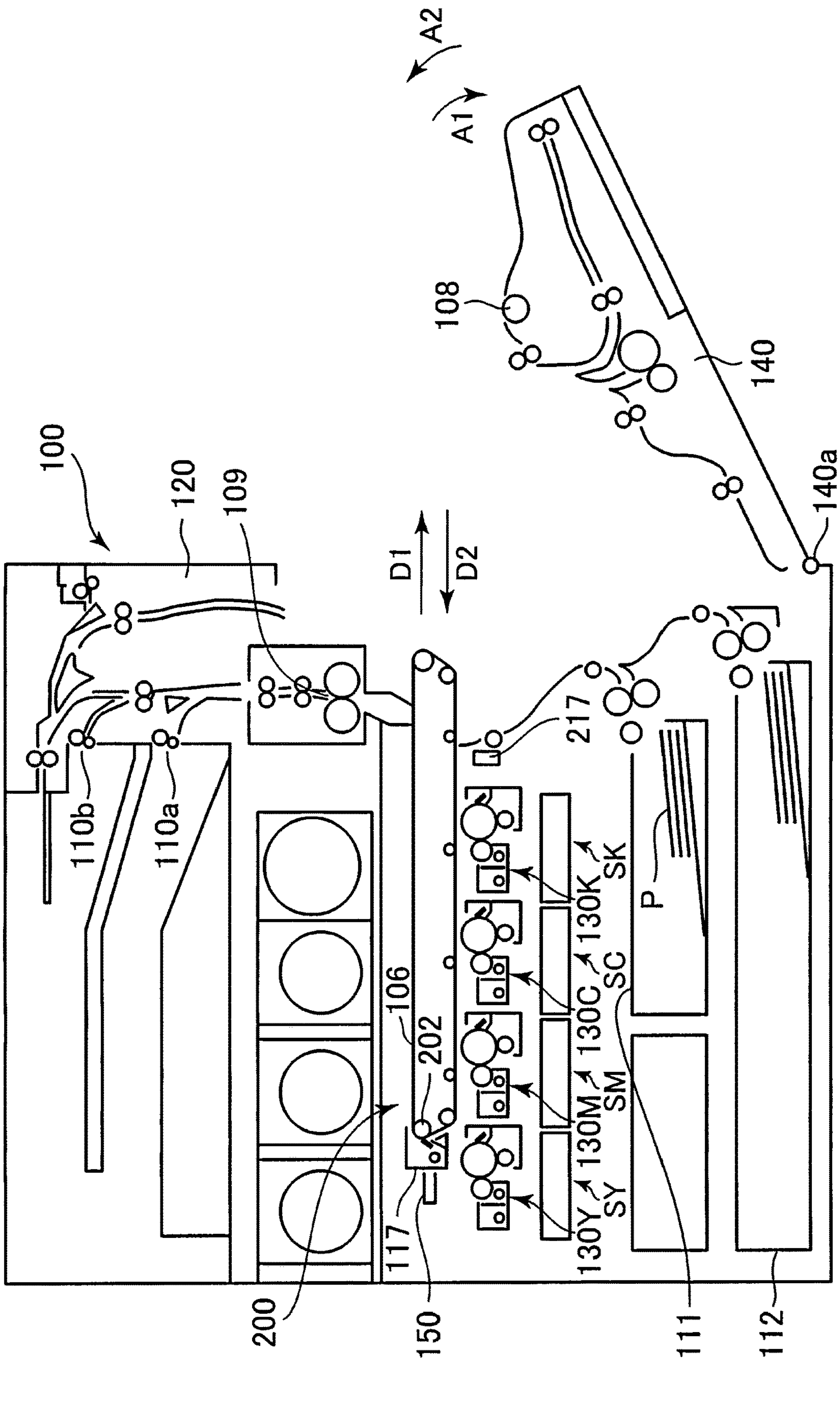
FIG. 4 is a schematic cross-sectional view of the image forming apparatus upon mounting and dismounting of the intermediary transfer unit.

Next, the mounting and dismounting of the intermediary transfer unit 200 with respect to the apparatus main assembly 120 in the present Embodiment will be described. FIG. 4 is a schematic cross-sectional view of the image forming apparatus 100 illustrating a state in which the intermediary transfer unit 200 is mounted and dismounted (inserted and removed) with respect to the apparatus main assembly 120.

As shown in FIG. 4, the image forming apparatus 100 is provided with a right door unit 140 on a side portion of the right side of the apparatus main assembly 120 as an opening/closing member, which opens an inside of the apparatus main assembly 120. The right door unit 140 is configured to be opened by an upper portion being rotated downward (in a direction of an arrow A1 in FIG. 4) and closed by the upper portion being rotated upward (in a direction of an arrow A2 in FIG. 4 (opposite direction to the direction of the arrow A1)) about a rotational shaft 140*a*, which is provided in a lower portion thereof and extended in the front-back direction. The right door unit 140 is opened/closed by a grip portion, etc. provided to the right door unit 140 being operated by a worker such as the user or a service engineer. The right door unit 140 is opened so that at least a portion of a conveyance path of the recording material P from the cassettes 111 and 112 through the secondary transfer portion N2 to the fixing device 109 is divided into a front surface (surface on which the toner image is transferred) side and a back surface side of the recording material P. The secondary transfer roller 108 is attached to the right door unit 140. When the right door unit 140 is opened, the inside of the apparatus main assembly 120 is opened so that the secondary transfer roller 108 is separated from the intermediary transfer belt 106. When the right door unit 140 is opened, the worker can access the intermediary transfer unit 200, which is mounted on the apparatus main assembly 120.

The worker can then dismount the intermediary transfer unit 200 from the apparatus main assembly 120 by pulling out the intermediary transfer unit 200 to the right side of the apparatus main assembly 120 (in a direction of an arrow D1 in FIG. 4). Conversely, the worker can mount the intermediary transfer unit 200 on the apparatus main assembly 120 by inserting the intermediary transfer unit 200 into the left side of the apparatus main assembly 120 (in a direction of an arrow D2 in FIG. 4 (opposite direction to the direction of the arrow D1)). The worker can move the intermediary transfer unit 200 by operating the grip portion, etc. provided to the first frame 240*a*, etc. of the intermediary transfer unit 200.

In the apparatus main assembly 120, rail-like mounting portions 150 are provided on both end portion sides in the widthwise direction of the intermediary transfer belt 106. The intermediary transfer unit 200 is supported by and moved along these mounting portions 150, and is positioned in a predetermined mounting position (FIG. 1) of the mounting portion 150 to complete the mounting. In the first frame 240*a* (FIG. 5) of the intermediary transfer unit 200, support receiving portions (positioning portions) 250 (first support receiving portions 250*a* and second support receiving portions 250*b*) are provided on both end portion sides in the widthwise direction of the intermediary transfer belt 106 so as to project toward outsides of the intermediary transfer unit 200 along the widthwise direction of the intermediary transfer belt 106 to engage with the above mounting portions 150 (FIG. 5). In the present Embodiment, to the first frame 240*a* of the intermediary transfer unit 200, the first support receiving portions 250*a* and the second support receiving portions 250*b*, which constitute the support receiving portions 250, are provided. The first support receiving portions 250*a* are provided, on a leading end side in the mounting direction D2 (FIG. 4) of the intermediary transfer unit 200 with respect to the apparatus main assembly 120, on both end portion sides in the widthwise direction of the intermediary transfer belt 106, respectively. In addition, the second support receiving portions 250*b* are provided, on a trailing end side in the mounting direction D2 (FIG. 4) of the intermediary transfer unit 200 with respect to the apparatus main assembly 120, on both end portion sides in the widthwise direction of the intermediary transfer belt 106, respectively.

In the present Embodiment, the intermediary transfer unit 200 is mounted and dismounted (inserted and removed) with respect to the apparatus main assembly 120 by being moved in substantially the horizontal direction along the photosensitive member tangent plane PL described above. In addition, in the present Embodiment, the intermediary transfer unit 200 is inserted into the apparatus main assembly 120 with the belt cleaning device 117 at a front. In other words, in the present Embodiment, the intermediary transfer unit 200 is inserted into the apparatus main assembly 120 with the tension roller 202, among the plurality of the stretching rollers 201 through 204, at the front. The mounting direction D2 of the intermediary transfer unit 200 with respect to the apparatus main assembly 120 is a direction substantially perpendicular to the rotational axis direction of the tension roller 202 (widthwise direction of the intermediary transfer belt 106).

5. Steering Mechanism

Next, a steering mechanism in the intermediary transfer unit 200 in the present Embodiment will be described. In the present Embodiment, the intermediary transfer unit 200 is provided with the steering mechanism which makes the tension roller 202, which applies the tension (tensile force) to the intermediary transfer belt 106, swingable to correct the shift of the intermediary transfer belt 106. The shift of the intermediary transfer belt 106 is a phenomenon in which a running position of the intermediary transfer belt 106 on the stretching roller in the rotational axis direction of the stretching roller is shifted (moved) to either end portion side in the rotational axis direction of the stretching roller. In particular, in the present Embodiment, the steering mechanism is constituted by a self alignment mechanism in which the tension roller 202, which functions as the steering roller, is tilted by an action with the intermediary transfer belt 106.

FIG. 5 is a schematic plan view of the intermediary transfer unit 200 in the present Embodiment as viewed from above. In FIG. 5, illustration of the belt cleaning device 117 is omitted. The frame 240 of the intermediary transfer unit 200 is constituted by the first frame 240*a* and the second frame (swing plate) 240*b*. The first frame 240*a* supports the driving roller 201, the pre-primary transfer roller 203, each of the primary transfer rollers 105Y, 105M, 105C and 105K, and the pre-secondary transfer roller 204. The second frame 240*b* is extended substantially parallel to the rotational axis direction of the tension roller 202 and supports the tension roller 202 at both end portions in a longitudinal direction thereof. The second frame 240*b* is swingably (rotatably) supported by the first frame 240*a* via a swing shaft provided to a central portion in the longitudinal direction thereof (not shown). As a result, the tension roller 202 supported by the second frame 240*b* becomes swingable about a swing axis substantially perpendicular to the rotational axis direction of the tension roller 202. The tension roller 202 is rotatably supported by the second frame 240*b* at both end portions in the rotational axis direction thereof via the bearing member 212, which is movably supported by an urging and supporting member 215 attached to the second frame 240*b*. Details of a supporting configuration of the tension roller 202, etc. will be described below.

In the present Embodiment, as the steering mechanism, for example, any available configuration such as a known configuration can be used as appropriate. An example of the configuration of the steering mechanism will be briefly described.

The bearing member 212 includes a sliding portion, at least in a portion of an outer periphery thereof, which can contact the inner peripheral surface of the intermediary transfer belt 106. When the running position of the intermediary transfer belt 106 is shifted (deviated) toward either end portion side in the rotational axis direction of the tension roller 202, hanging widths between the intermediary transfer belt 106 and the sliding portion in both end portions in the widthwise direction of the intermediary transfer belt 106 differ, and difference in frictional force between the inner peripheral surface of the intermediary transfer belt 106 and the sliding portion in both end portions in the widthwise direction of the intermediary transfer belt 106 is generated. In response to this difference in the frictional force, the tension roller 202 (second frame 240*b*) is tilted and a steering to correct the shift of the intermediary transfer belt 106 is performed.

6. Tension Mechanism

Next, a tension mechanism which applies the tension to the intermediary transfer belt 106 in the intermediary transfer unit 200 in the present Embodiment will be described. As described above, FIG. 5 is the schematic plan view of the intermediary transfer unit 200 in the present Embodiment as viewed from above.

The tension roller 202 is provided with a rotation shaft 202*a* projecting from both end portions in the rotational axis direction thereof. The tension roller 202 is rotatably supported by the bearing members 212 by the rotation shaft 202*a* at both end portions being fitted and inserted to supporting holes 211*a* provided to bearing portions 211 of the bearing members 212, respectively. At both end portions in the rotational axis direction of the tension roller 202, the bearing members 212 are movably supported by the urging and supporting members 215 attached to the second frame 240*b*. To the urging and supporting member 215, a sliding guide 213 as a guiding portion is provided, and the bearing member 212 is supported by the urging and supporting member 215 so as to be movable in sliding via this sliding guide 213. The sliding guide 213 restricts moving directions of the bearing member 212 in a direction from the inner peripheral surface side of the intermediary transfer belt 106 toward the outer peripheral surface side, which is indicated by an arrow J in FIG. 5, and an opposite direction thereto, and supports the bearing member 212. And at both end portions in the rotational axis direction of the tension roller 202, tension springs 214 constituted by compression coil springs, which are urging members (elastic members) as urging means, are disposed between the bearing member 212 and the urging and supporting member 215 in a contracted state, respectively. The tension spring 214 applies the tension force, which acts on the inner peripheral surface of the intermediary transfer belt 106, to the tension roller 202. An urging direction of the tension spring 214 is a direction from a center of the rotation shaft 202*a* of the tension roller 202 toward an area where the intermediary transfer belt 106 is wound around the tension roller 202.

As such, the tension roller 202, at both end portions in the rotational axis direction thereof, applies the tension force to the intermediary transfer belt 106 by the pair of the bearing members 212 being urged by the pair of the tension springs (spring members) 214. In a state in which the intermediary transfer belt 106 is stretched by the stretching rollers 201 through 204, the bearing member 212 applies predetermined tension (tensile force) to the intermediary transfer belt 106 by moving the tension spring 214 in a direction contracting the tension spring 214 from a natural length thereof along the direction of the arrow J in FIG. 5. Here, the natural length of the tension spring 214 is a length in an extending and contracting direction of the tension spring 214 in a state in which no contracting force is applied to the tension spring 214.

Figure 6:
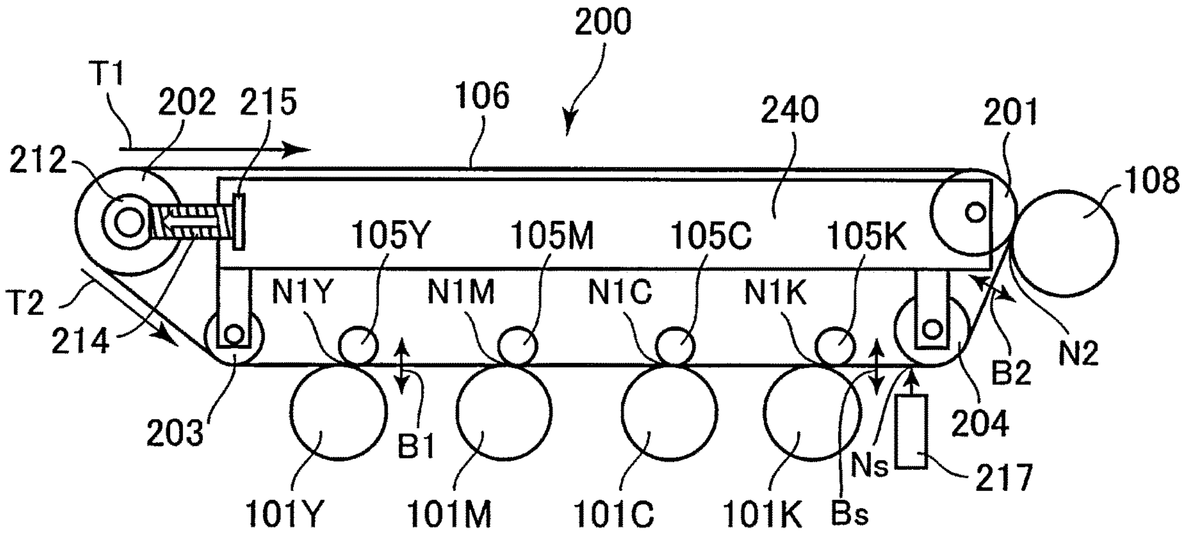
FIG. 6 is a schematic cross-sectional view for describing a tension mechanism of the intermediary transfer unit.

FIG. 6 is a schematic cross-sectional view of the intermediary transfer unit 200 as viewed from the front side (illustrating a cross-section substantially perpendicular to the rotational axis direction of the photosensitive drum 101). In FIG. 6, the photosensitive drum 101, the secondary transfer roller 108 and the sensor unit 217 are illustrated as well. In addition, in FIG. 6, illustration of the belt cleaning device 117 is omitted.

When the intermediary transfer belt 106 is stretched over the plurality of the stretching rollers 201 through 204 and rotated, to the intermediary transfer belt 106, tension T1 and T2 are applied by the tension spring 214. The tension T1 is tension applied from the tension roller 202 to the driving roller 201 side, and the tension T2 is tension applied from the tension roller 202 to the pre-primary transfer roller 203 side. By this, the intermediary transfer belt 106 is conveyed with being gripped by the driving roller 201. At this time, in a case in which no tension is applied to the intermediary transfer belt 106, the driving roller 201 may not be able to grip the intermediary transfer belt 106 and spin idle.

In addition, in a case in which the tension T1 and T2 applied to the intermediary transfer belt 106 is less than a predetermined value, even to an extent in which the intermediary transfer belt 106 can be conveyed, it becomes likely for waving to occur in the intermediary transfer belt 106. The waving of the intermediary transfer belt 106 is a phenomenon in which the surface of the intermediary transfer belt 106 flops in a direction crossing the moving direction of the surface thereof, as indicated by arrows B1, B2 and Bs in FIG. 6. In a case in which the waving occurs in the intermediary transfer belt 106, and if the waving occurs in the primary transfer surface (surface including the primary transfer portions N1Y, N1M, N1C and N1K) (the arrow B1), image defect due to primary transfer defect may occur. In addition, if the waving occurs in the secondary transfer surface (surface immediately before the secondary transfer portion N2) (the arrow B2), image defect due to secondary transfer defect may occur. In addition, if the waving occurs in a surface opposite to the sensor unit 217 (surface including a detecting position Ns of the sensor unit 217) (the arrow Bs), image density defect or color misalignment may occur due to detection defect of the sensor unit 217. In order to improve productivity of the image forming apparatus 100, it is effective to increase a conveyance speed of the intermediary transfer belt 106. As the conveyance speed of the intermediary transfer belt 106 is increased, however, it becomes likely for the waving to become significant.

Furthermore, as mentioned above, the waving is not the only problem which occurs in the case in which the tension T1 and T2 applied to the intermediary transfer belt 106 is less than the predetermined value. For example, when the recording material P enters the secondary transfer surface, an impact is generated to the intermediary transfer belt 106, and the impact is likely transmitted to the primary transfer surface and the photosensitive drum 101. The impact may then affect the formations of the toner image and the electrostatic latent image, resulting in image defect, in which the image experiences disturbance and which is referred to as a "shock image", etc.

Thus, in order to convey the intermediary transfer belt 106 properly and to suppress the image defect, it is necessary to apply the tension at the predetermined value or higher upon conveying the intermediary transfer belt 106.

7. Curling

Next, the curling of the intermediary transfer belt 106 will be described.

The intermediary transfer unit 200 is a consumable part and may take some time until the intermediary transfer unit 200 is mounted on the apparatus main assembly 120 after being produced. In this case, positional relationship between the intermediary transfer belt 106 and the stretching rollers 201 through 204 does not change and the intermediary transfer belt 106 is in a state in which the same position in a peripheral direction thereof is wound around the stretching rollers 201 through 204. Therefore, if the same tension is always applied to the intermediary transfer belt 106 as, for example, during the conveyance (during the image formation) of the intermediary transfer belt 106, creep deformation of the intermediary transfer belt 106 may occur along a shape of each stretching roller at the position where the intermediary transfer belt 106 is wound around each stretching roller. This creep deformation causes a mark (deformation to occur) on the intermediary transfer belt 106, which is referred to as the "curling", etc. The curling of the intermediary transfer belt 106 is more likely to occur due to changes in temperature, such as when the intermediary transfer unit 200 is stored for a long period of time in a place with inconsistent temperature control, such as a warehouse. In particular, in a case in which thermoplastic resin is used as the material for the intermediary transfer belt 106, the curling of the intermediary transfer belt 106 tend to be deepened.

Figure 7:
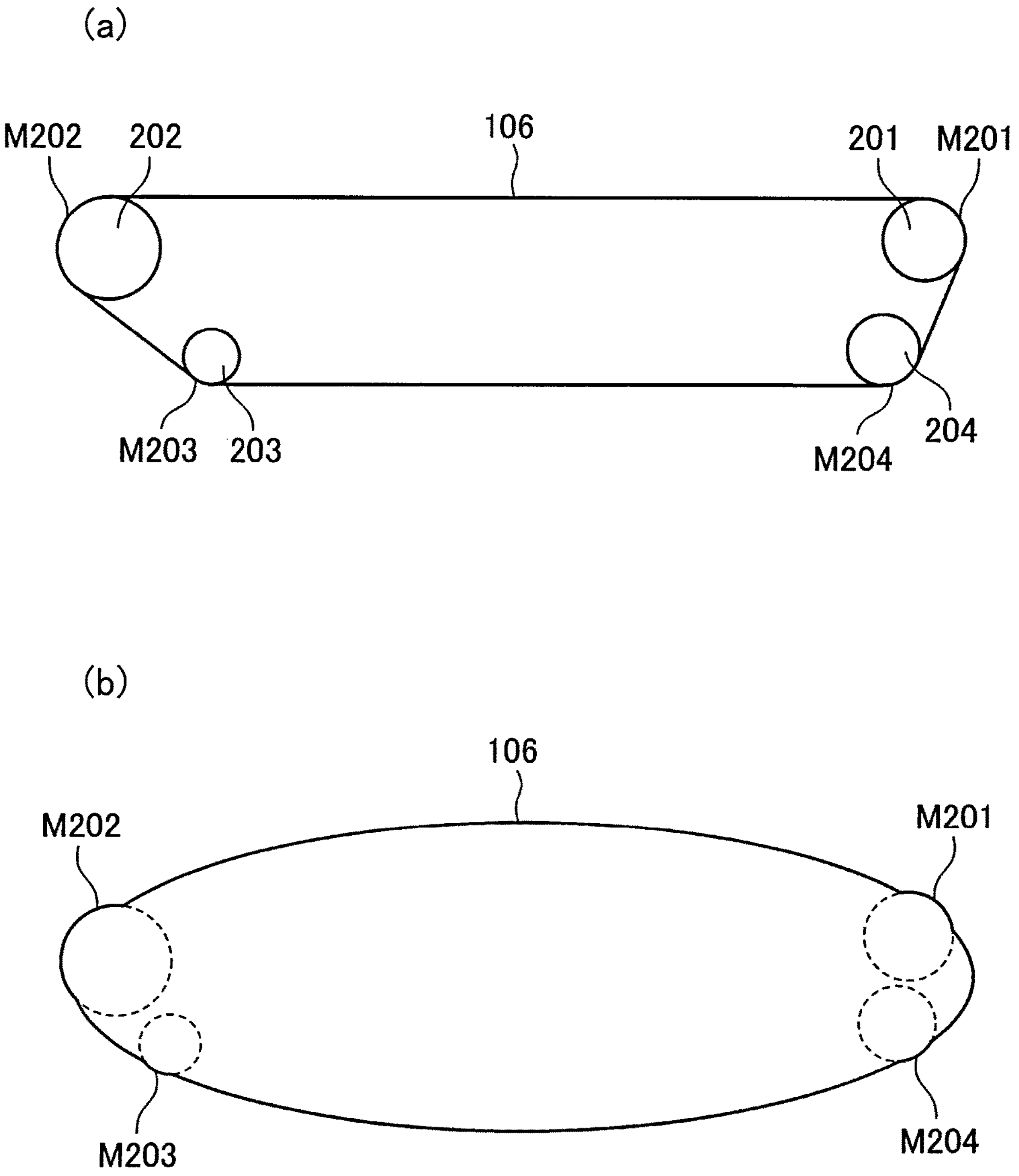
FIG. 7, part (a) and part (b), is a schematic cross-sectional view of the intermediary transfer belt for describing a curling of the intermediary transfer belt.

Part (a) and part (b) of FIG. 7 are schematic cross-sectional views of the intermediary transfer belt 106 as viewed from the front side for describing the curling of the intermediary transfer belt 106. As shown in part (a) of FIG. 7, for example, in the case in which the same tension continues to be applied to the intermediary transfer belt 106 as during the conveyance of the intermediary transfer belt 106, the curling (creep deformation) of the intermediary transfer belt 106 may occur at positions of the stretching rollers 201 through 204. In particular, the curling of the intermediary transfer belt 106 tends to occur significantly at a position of the stretching roller (the driving roller 201, the tension roller 202, etc.) where a winding angle of the intermediary transfer belt 106 is large. The curling which occurs at the position of each stretching roller 201 through 204 is defined as M201 through M204, respectively. The curling of the intermediary transfer belt 106 may occur as a deformation which is apparent even when the intermediary transfer belt 106 is dismounted from the intermediary transfer unit 200, as shown in part (b) of FIG. 7.

Figure 8:
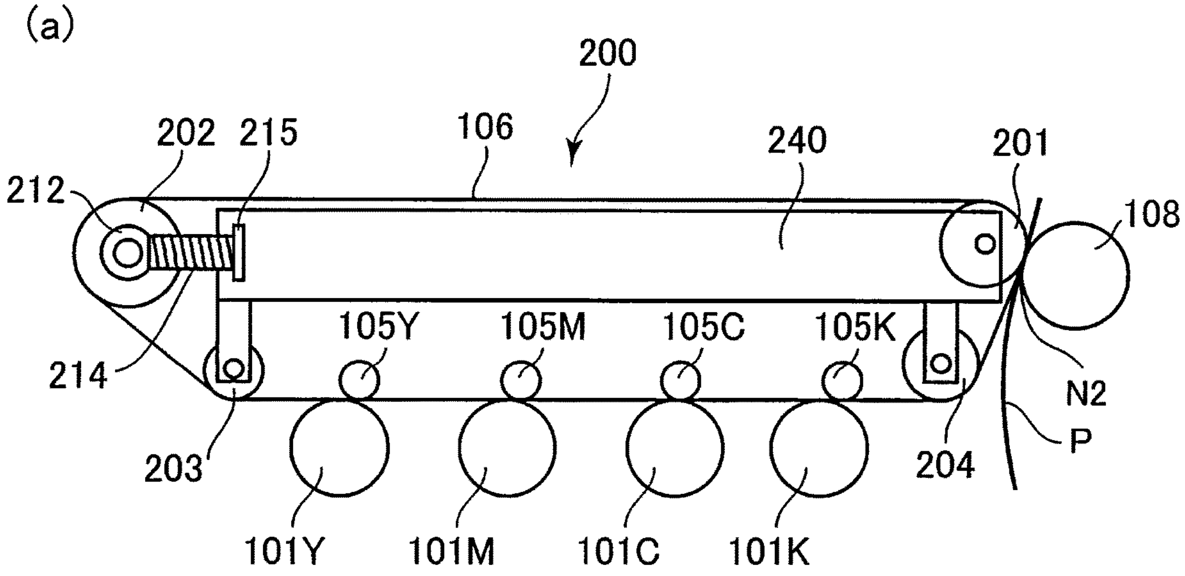
FIG. 8, part (a) and part (b), is a schematic cross-sectional view of a portion of the image forming apparatus for describing effect of the curling.
Figure 8:
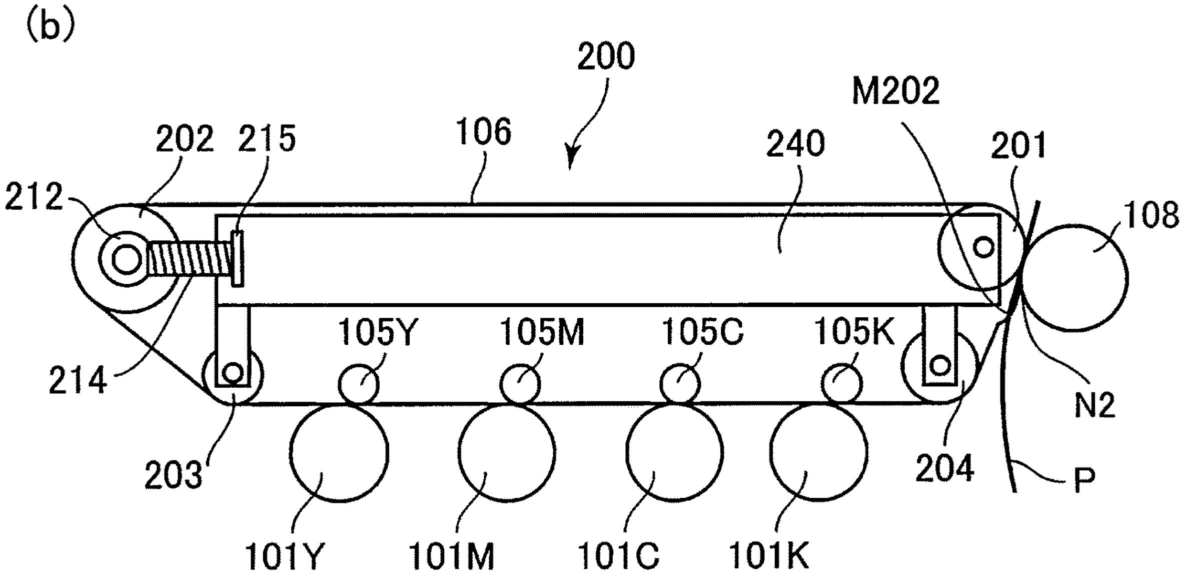

Part (a) and part (b) of FIG. 8 illustrates schematic cross-sectional views of a vicinity of the intermediary transfer unit 200 as viewed from the front side in a state in which the recording material P is in the secondary transfer portion N2 during the image formation (illustrating a cross-section substantially perpendicular to the rotational axis direction of the photosensitive drum 101).

As described above, when the toner image is transferred from the intermediary transfer belt 106 to the recording material P in the secondary transfer portion N2, the intermediary transfer belt 106 and the recording material P enter the secondary transfer portion N2. As shown in part (a) of FIG. 8, in a case in which the intermediary transfer belt 106 has no curling, the recording material P and the intermediary transfer belt 106 enter the secondary transfer portion N2 so that the recording material P and the intermediary transfer belt 106 are alongside each other. In contrast, as shown in part (b) of FIG. 8, in a state in which the intermediary transfer belt 106 has the curling, the toner image on the intermediary transfer belt 106 contacts the record material P before entering the secondary transfer portion N2, and the record material P and the intermediary transfer belt 106 enter the secondary transfer portion N2 while states of the curling M201 through M204 are maintained. During this process, the recording material P and the toner image on the intermediary transfer belt 106 may be rubbed against each other, resulting in image defect at the portions of the curling. Similarly, the disturbance of the toner image may occur in the primary transfer portion N1 as well. In other words, if the intermediary transfer belt 106 has the curling, transfer defect of the toner image may occur in the primary transfer portion N1 and the secondary transfer portion N2, causing quality of the image on the recording material P to be deteriorated.

Thus, in the case in which the curling occurs in the intermediary transfer belt 106, the image defect may occur. Therefore, it is desirable for the intermediary transfer unit 200, specifically, for the intermediary transfer unit 200 in a packed state, waiting to be mounted on the apparatus main assembly 120 as a consumable part that the tension of the intermediary transfer belt 106 be loosened.

8. Tension Loosening Member (Tension Releasing Member)

Next, a tension loosening member, which is used to loosen the tension of the intermediary transfer belt 106 in the present Embodiment, will be described. Incidentally, in the present Embodiment, the tension loosening member is dismounted from a main assembly of the intermediary transfer unit 200 when the intermediary transfer unit 200 is mounted on the apparatus main assembly 120, but constitutes the intermediary transfer unit 200 in the packed state, for example. Here, a portion of the intermediary transfer unit 200 excluding the tension loosening member is referred to as a unit main assembly 220.

Figure 9:
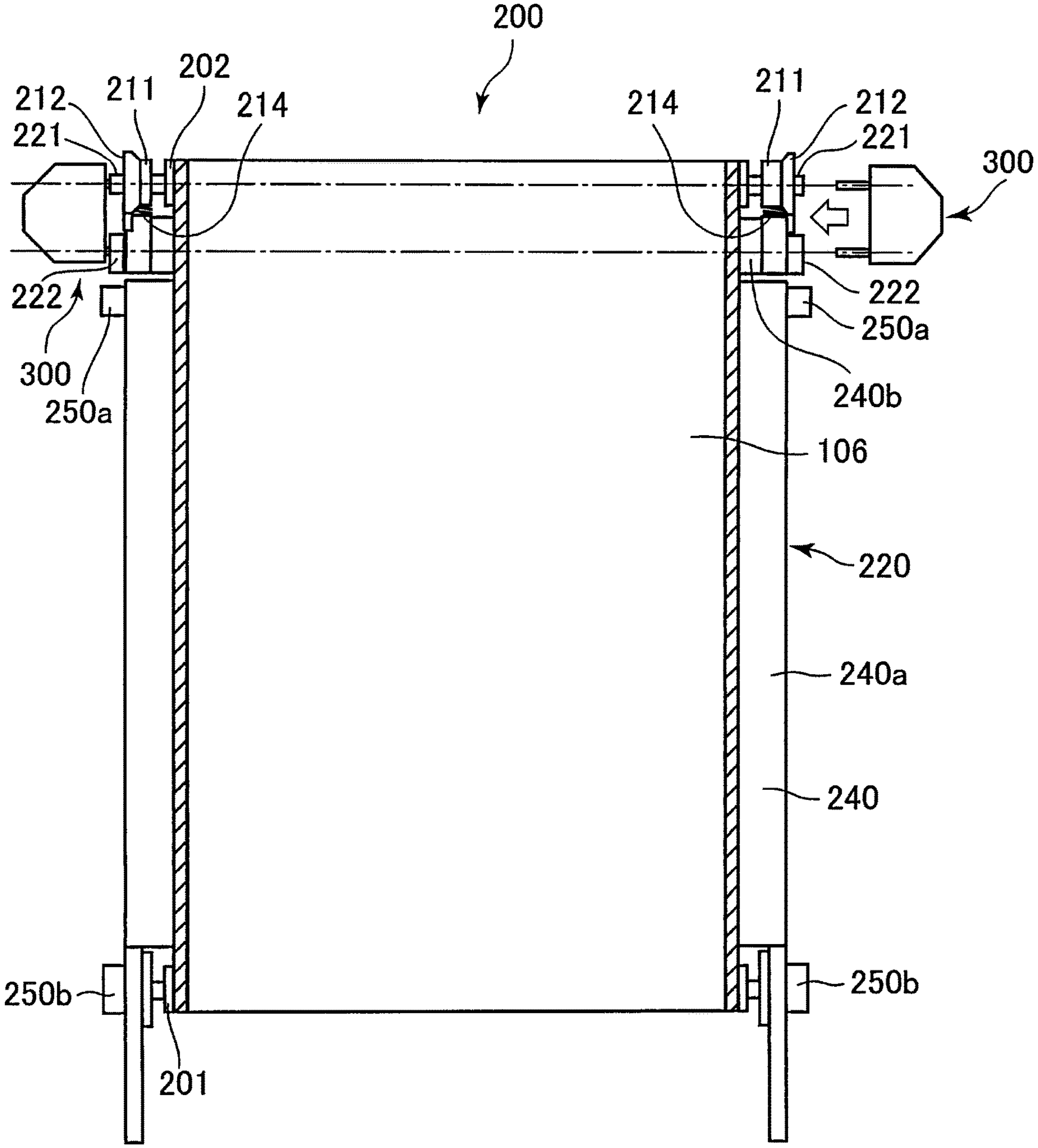
FIG. 9 is a schematic plan view of the intermediary transfer unit in a state in which a tension loosening member is mounted on a unit main assembly as viewed from above.
Figure 10:
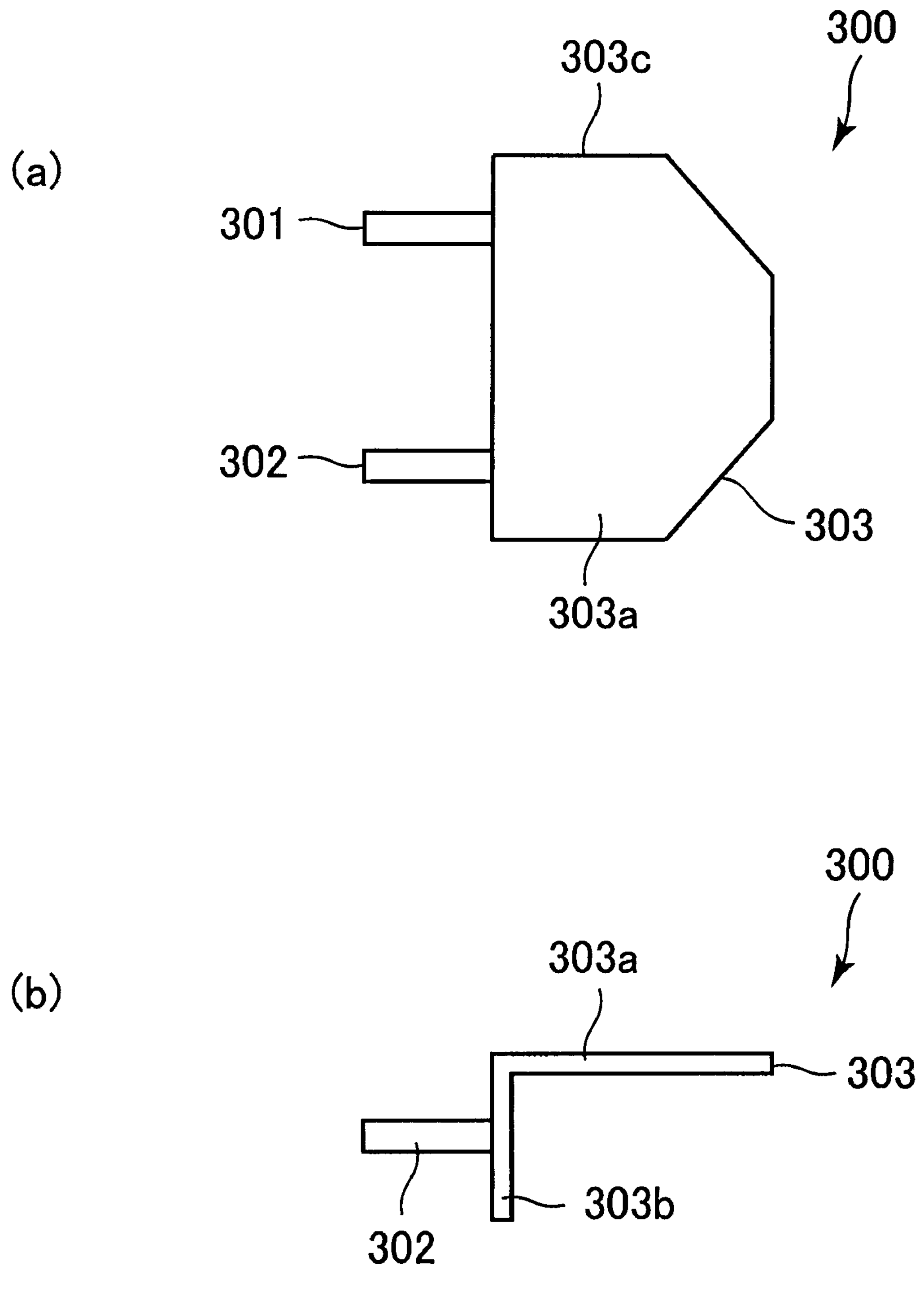
FIG. 10, part (a) and part (b), includes a schematic plan view and side view of the tension loosening member.

FIG. 9 is a schematic plan view of the intermediary transfer unit 200 as viewed from above in a state in which a tension loosening member 300 in the present Embodiment is mounted on the unit main assembly 220. In FIG. 9, illustration of the belt cleaning device 117 is omitted. In addition, in FIG. 9, the tension loosening member 300 on one end portion side in the rotational axis direction of the tension roller 202 is illustrated in a state of being dismounted from the unit main assembly 220. In addition, FIG. 10 is a schematic view illustrating the tension loosening member 300 in the present Embodiment, and part (a) of FIG. 10 is a schematic plan view as viewed from above, and part (b) of FIG. 10 is a schematic side view of the intermediary transfer unit 200 as viewed along the mounting direction D2 with respect to the apparatus main assembly 120. In FIG. 10, the tension loosening member 300 mounted on the rear side of unit main assembly 220 is illustrated.

Incidentally, in the present Embodiment, the tension loosening members 300 are mounted on both end portion sides of the unit main assembly 220 in the rotational axis direction of the tension roller 202. And configurations of a pair of the tension loosening members 300 mounted on both end portion sides of the tension roller 202 are substantially symmetrical with respect to a plane passing through a center in the rotational axis direction of the tension roller 202 and substantially perpendicular to the rotational axis direction thereof. Therefore, with respect to the pair of tension loosening members 300, the description will focus on only one of the pair, as appropriate.

To loosen the tension of the intermediary transfer belt 106, it is necessary to contract the tension spring 214 and maintain that state. For this purpose, in the present Embodiment, the tension loosening member 300 is used. In the present Embodiment, the tension loosening member 300 is made of metal in order to maintain the above state without creep deformation against relatively strong tension by the tension spring 214. The present invention is not limited thereto, however, but the tension loosening member 300 may be made of material other than metal or material including material other than metal, such as resin, as long as the material has sufficient strength.

In the present Embodiment, the tension loosening member 300 includes a base plate 303 formed of a sheet metal as a base portion, a first shaft portion 301 as a first engaging portion and a second shaft portion 302 as a second engaging portion attached to the base plate 303.

The base plate 303 includes a first portion 303*a* and a second portion 303*b*. The first portion 303*a* is extended substantially horizontally in the present Embodiment so that the tension loosening member 300 is projecting toward the outside of the unit main assembly 220 along the rotational axis direction of the tension roller 202 in a state in which the tension loosening member 300 is mounted on the unit main assembly 220. The second portion 303*b* is extended in a direction crossing (substantially perpendicular to, in the present Embodiment) the extended direction (plane) of the first portion 303*a* and is disposed substantially parallel to the gravity direction in the state in which the tension loosening member 300 is mounted on the unit main assembly 220. In the present Embodiment, the first portion 303*a* and the second portion 303*b* are formed by bending a sheet metal.

The first shaft portion 301 is extended in a direction crossing (substantially perpendicular to, in the present Embodiment) the extended direction (plane) of the second portion 303*b* of the base plate 303, and is disposed substantially horizontally in the state in which the tension loosening member 300 is mounted on the unit main assembly 220. The second shaft portion 302 is extended substantially parallel to the first shaft portion 301. In the present Embodiment, the first shaft portion 301 and the second shaft portion 302 have a cylindrical shape, respectively. Outer diameters and lengths of the first shaft portion 301 and the second shaft portion 302 may be substantially the same or different from each other. The first shaft portion 301 and the second shaft portion 302 are inserted into a first mounting hole 221 and a second mounting hole 222 provided on the unit main assembly 220 side, respectively, as described below. By this, the tension loosening member 300 is mounted on the unit main assembly 220 (see FIG. 13).

A distance between the first shaft portion 301 and the second shaft portion 302 is set so that the length of the tension spring 214 in the extending and contracting direction can be made shorter than an active length in the state in which the tension loosening member 300 is mounted on the unit main assembly 220. Here, the active length of the tension spring 214 is a length of the tension spring 214 in the extending and contracting direction in a state in which the tension loosening member 300 is not mounted on the unit main assembly 220 and the intermediary transfer belt 106 is stretched over the plurality of the stretching rollers 201 through 204. Typically, the active length of the tension spring 214 is a length of the tension spring 214 in the extending and contracting direction in a state in which the intermediary transfer belt 106 is stretched over the plurality of the stretching rollers 201 through 204 and rotated. By this, it becomes possible to reduce (loosen) the tension applied to the intermediary transfer belt 106 in a state in which the tension loosening member 300 is mounted on the unit main assembly 220 less than that in a state in which the tension loosening member 300 is not mounted on the unit main assembly 220. The length of the tension spring 214 in the extending and contracting direction in the state in which the tension loosening member 300 is mounted on the unit main assembly 220 can be set as appropriate to sufficiently suppress the curling of the intermediary transfer belt 106. Incidentally, in the present Embodiment, the length of the tension spring 214 in the extending and contracting direction in the state in which the tension loosening member 300 is mounted on the unit main assembly 220 is shorter than the length of the tension spring 214 in the extending and contracting direction in any of the stretching modes of the intermediary transfer belt 106 described with reference to FIG. 3, i.e., the all contacting state, the black contacting state and the all separated state. When the tension loosening member 300 is mounted on the unit main assembly 220, the intermediary transfer belt 106 may be in a state in which substantially no tension is applied thereto (tension thereof is released).

To the unit main assembly 220, the first mounting hole 221 as a first engaged portion and the second mounting hole 222 as a second engaged portion are provided. In the present Embodiment, the first mounting hole 221 is provided on an end portion of the rotation shaft 202*a* of the tension roller 202 substantially parallel to the rotational axis direction of the tension roller 202, so as to be open toward an outside of the rotation shaft 202*a*. In addition, in the present Embodiment, the second mounting hole 222 is provided to the urging and supporting member 215 attached to the second frame 240*b* substantially parallel to the rotational axis direction of the tension roller 202 in a case in which the plurality of the tensioning rollers 201 through 204 are substantially parallel, so as to be open toward an outside of the urging and supporting member 215. The first engaged portion, such as the first mounting hole 221, together with the tension roller 202, which is a member on one end portion side of the tension spring 214 in the extending and contracting direction, is provided to be relatively movable in the extending and contracting direction of the tension spring 214 with respect to the urging and supporting member 215 as a member on the other end portion side in the extending and contracting direction of the tension spring 214. The second engaged portion, such as the second mounting hole 222, together with the urging and supporting member 215 as a member on the opposite side of the tension roller 202 via the tension spring 214 (the above member on the other end portion side), is provided to be relatively movable in the extending and contracting direction of the tension spring 214 with respect to the tension roller 202. In the case in which the plurality of the stretching rollers 201 through 204 are substantially parallel, an extended direction of the first mounting hole 221 and an extended direction of the second mounting hole 222 are substantially parallel to each other. In the present Embodiment, the first mounting hole 221 and the second mounting hole 222 have cylindrical shapes, respectively. In addition, inner diameters and lengths of the first mounting hole 221 and the second mounting hole 222 are set so that it becomes possible to maintain the tension spring 214 in the contracted state as described above by the first shaft portion 301 and the second shaft portion 302 being inserted thereto, respectively.

Upon mounting the tension loosening member 300 on the unit main assembly 220, the tension roller 202 (bearing member 212) is moved so as the tension spring 214 to be contracted, and positions of the first mounting hole 221 and the second mounting hole 222 are aligned to the positions of the first shaft portion 301 and the second shaft portion 302, respectively. The tension loosening member 300 is then mounted on the unit main assembly 220 by inserting the first shaft portion 301 and the second shaft portion 302 into the first mounting hole 221 and the second mounting hole 222, respectively. In this manner, in the present Embodiment, by the two shafts of the tension loosening member 300 being inserted into the two holes of the unit main assembly 220, the tension loosening member 300 is mounted on the unit main assembly 220.

By mounting the tension loosening member 300 on the unit main assembly 220, it becomes possible to loosen the tension applied to the intermediary transfer belt 106. In addition, by mounting the tension loosening member 300 on the unit main assembly 220, it becomes possible to fix the length of the tension spring 214 in the extending and contracting direction. By this, it becomes less likely for shocks caused by vibration, dropping or the like during transportation, etc. to the intermediary transfer unit 200 as a consumable part to be transmitted to the tension spring 214. As a result, it becomes possible to prevent damage to peripheral components, etc. due to strong force exerted by the tension spring 214 inside the intermediary transfer unit 200.

Figure 11:
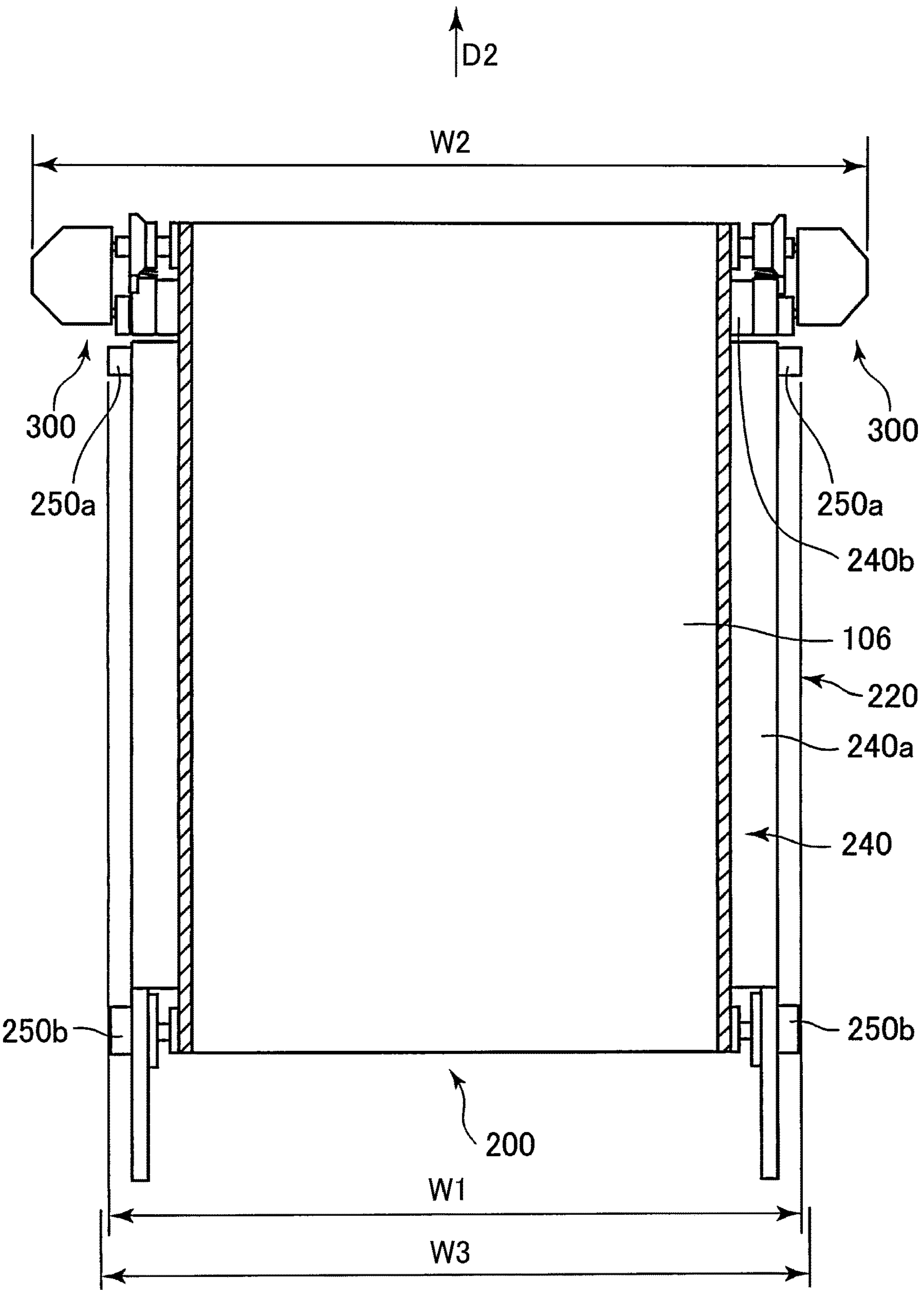
FIG. 11 is a schematic plan view of the intermediary transfer unit as viewed from above for describing relationship between the intermediary transfer unit and an apparatus main assembly.
Figure 12:
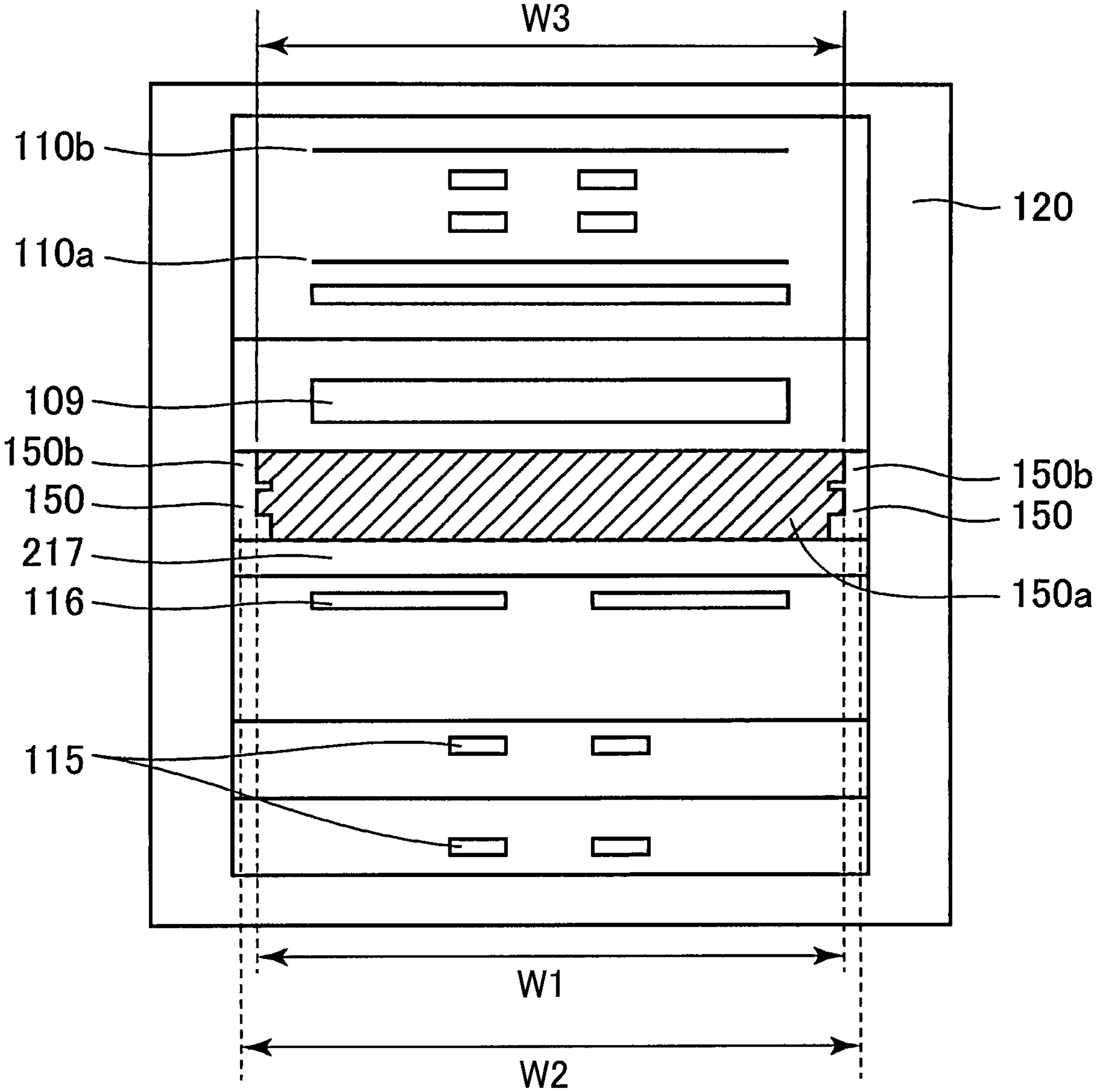
FIG. 12 is a schematic side view of the apparatus main assembly as viewed from a right side thereof for describing the relationship between the intermediary transfer unit and the apparatus main assembly.

With reference to FIG. 11 and FIG. 12, relationship between the apparatus main assembly 120 and the intermediary transfer unit 200 will be described. FIG. 11 is a schematic plan view of the intermediary transfer unit 200 as viewed from above with the tension loosening member 300 in the present Embodiment being mounted on the unit main assembly 220.

In addition, FIG. 12 is a schematic side view of the apparatus main assembly 120 in the present Embodiment as viewed from a right direction. In FIG. 12, illustration of the right door unit 140 is omitted.

As shown in FIG. 11, a maximum width (dimension of outermost shape) of the intermediary transfer unit 200 in the widthwise direction of the intermediary transfer belt 106 in the state in which the tension loosening member 300 is not mounted on the unit main assembly 220 is defined as W1. In addition, as shown in FIG. 11, a maximum width (dimension of outermost shape) of the intermediary transfer unit 200 in the widthwise direction of the intermediary transfer belt 106 in the state in which the tension loosening member 300 is mounted on the unit main assembly 220 is defined as W2. In addition, as shown in FIG. 12, a maximum width between inner surfaces of the mounting portions 150 provided to the apparatus main assembly 120 in the widthwise direction of the intermediary transfer belt 106 is defined as W3. Incidentally, the widthwise direction of the intermediary transfer belt 106 is a direction which is substantially parallel to the rotational axis direction of the tension roller 202 and is substantially perpendicular to the mounting direction D2 of the intermediary transfer unit 200 with respect to the apparatus main assembly 120.

In the present Embodiment, the width W1 is a wider width of a width between outsides of end portions of the first support receiving portion 250*a* provided to the first frame 240*a* on both side end portion sides in the widthwise direction of the intermediary transfer belt 106 and a width between outsides of end portions of the second support receiving portion 250*b* provided to the first frame 240*a* on both end portion sides. Incidentally, in the present Embodiment, the width between the outsides of the end portions of the first support receiving portion 250*a* and the width between the outsides of the end portions of the second support receiving portion 250*b* are substantially the same.

Incidentally, in the present Embodiment, the width W2 is a width between outsides of end portions of the first portions 303*a* of the base plates 303 in the tension loosening members 300 mounted on the unit main assembly 220 at both end portion sides of the intermediary transfer belt 106.

In addition, in the present Embodiment, the width W3 is a larger width of a width between side surfaces of rails which support (or pass) the first support receiving portion 250*a* and a width between side surfaces of rails which support (or pass) the second support receiving portion 250*b* in the mounting portions 150 provided to both end portion sides in the widthwise direction of the intermediary transfer belt 106 in the apparatus main assembly 120. Incidentally, in the present Embodiment, the above width between the side surfaces of the rails which support the first support receiving portion 250*a* and the above width between the side surfaces of the rails which support the second support receiving portion 250*b* are substantially the same. The width W3 is, put another way, a maximum width of an inlet for the mounting portion 150*a*, which is an area of the apparatus main assembly 120 to which the intermediary transfer unit 200 is mounted (shaded portion in FIG. 12), as viewed along the mounting direction D2 of the intermediary transfer unit 200 with respect to the apparatus main assembly 120.

In this case, the width W2 is configured to be larger than the width W1, and the width W2 is configured to be larger than the width W3. Incidentally, the width W3 is larger than the width W1. In other words, the widths W1, W2 and W3 are configured to have relationship of W2>W3>W1.

Normally, the intermediary transfer unit 200 is mounted on the apparatus main assembly 120 after the tension loosening member 300 is dismounted from the unit main assembly 220. In the state in which the tension loosening member 300 is dismounted from the unit main assembly 220, since it has the relationship of W3>W1, the intermediary transfer unit 200 can be mounted on (inserted into) the mounting portion 150 of the apparatus main assembly 120.

In contrast, in the state in which the tension loosening member 300 is mounted on the unit main assembly 220, it has the relationship of W2>W3. Therefore, in the state in which the tension loosening member 300 is not dismounted from the unit main assembly 220, the intermediary transfer unit 200 cannot be mounted on (inserted into) the mounting portion 150 of the apparatus main assembly 120. In this case, an abutting portion 303*c* (part (a) of FIG. 10) as a contacting portion of the first portion 303*a* of the base plate 303 in the tension loosening member 300 abuts a contacting portion 150*b* (FIG. 12) as a contacted portion of the apparatus main assembly 120. The abutting portion 303*c* is constituted by an edge portion of the first portion 303*a* on a leading end side in the mounting direction D2 of the intermediary transfer unit 200 with respect to the apparatus main assembly 120. In addition, the contacting portion 150*b* is constituted by an edge portion of the inlet of the mounting portion 150*a* of the intermediary transfer unit 200 in the apparatus main assembly 120. Incidentally, the first portion 303*a* of the base plate 303 in the tension loosening member 300 constitutes a handle portion which is operable by the worker upon pulling out the tension loosening member 300 from the unit main assembly 220.

In addition, in the present Embodiment, the tension loosening members 300 are provided to both end portions of the intermediary transfer belt 106, respectively. And it is configured as, even in a case in which only one of the two tension loosening members 300 is removed, the intermediary transfer unit 200 cannot be mounted on (inserted into) the mounting portion 150 of the apparatus main assembly 120.

In addition, in the present Embodiment, the intermediary transfer unit 200 is inserted into the apparatus main assembly 120 with the tension roller 202, among the plurality of the stretching rollers 201 through 204, at the front. And the first mounting hole 221 and the second mounting hole 222 are provided on a downstream side (leading end side of the intermediary transfer unit 200) of the first support receiving portion 250*a*, which first engages with the mounting portion 150, in the mounting direction D2 of the intermediary transfer unit 200 with respect to the apparatus main assembly 120. Therefore, when an attempt is made to mount the intermediary transfer unit 200 on the apparatus main assembly 120 in the state in which the tension loosening member 300 is not dismounted from the unit main assembly 220, before the first support receiving portion 250*a* of the intermediary transfer unit 200 engages with the rail-shaped mounting portion 150 of the apparatus main assembly 120, the abutting portion 303*c* of the tension loosening member 300 is in contact with the contacting portion 150*b* of the apparatus main assembly 120. Therefore, the worker can notice that the tension loosening member 300 is forgotten to be removed before the intermediary transfer unit 200 is on the rails. By this, it becomes possible to prevent the intermediary transfer unit 200 from being forcibly moved on the rails in the state in which the tension loosening member 300 is not dismounted from the unit main assembly 220, causing damage, etc. to the intermediary transfer unit 200 or the apparatus main assembly 120. Thus, according to the present Embodiment, it becomes possible to prevent the intermediary transfer unit 200 from being mounted on the apparatus main assembly 120 with forgetting to dismount the tension loosening member 300. By this, it becomes possible to prevent the intermediary transfer unit 200 from being mounted on the apparatus main assembly 120 with the tension of the intermediary transfer belt 106 being loosened, which may cause damage, image defect, or the like due to inability to properly drive the intermediary transfer belt 106.

9. Dismounting of the Tension Loosening Member

Figure 13:
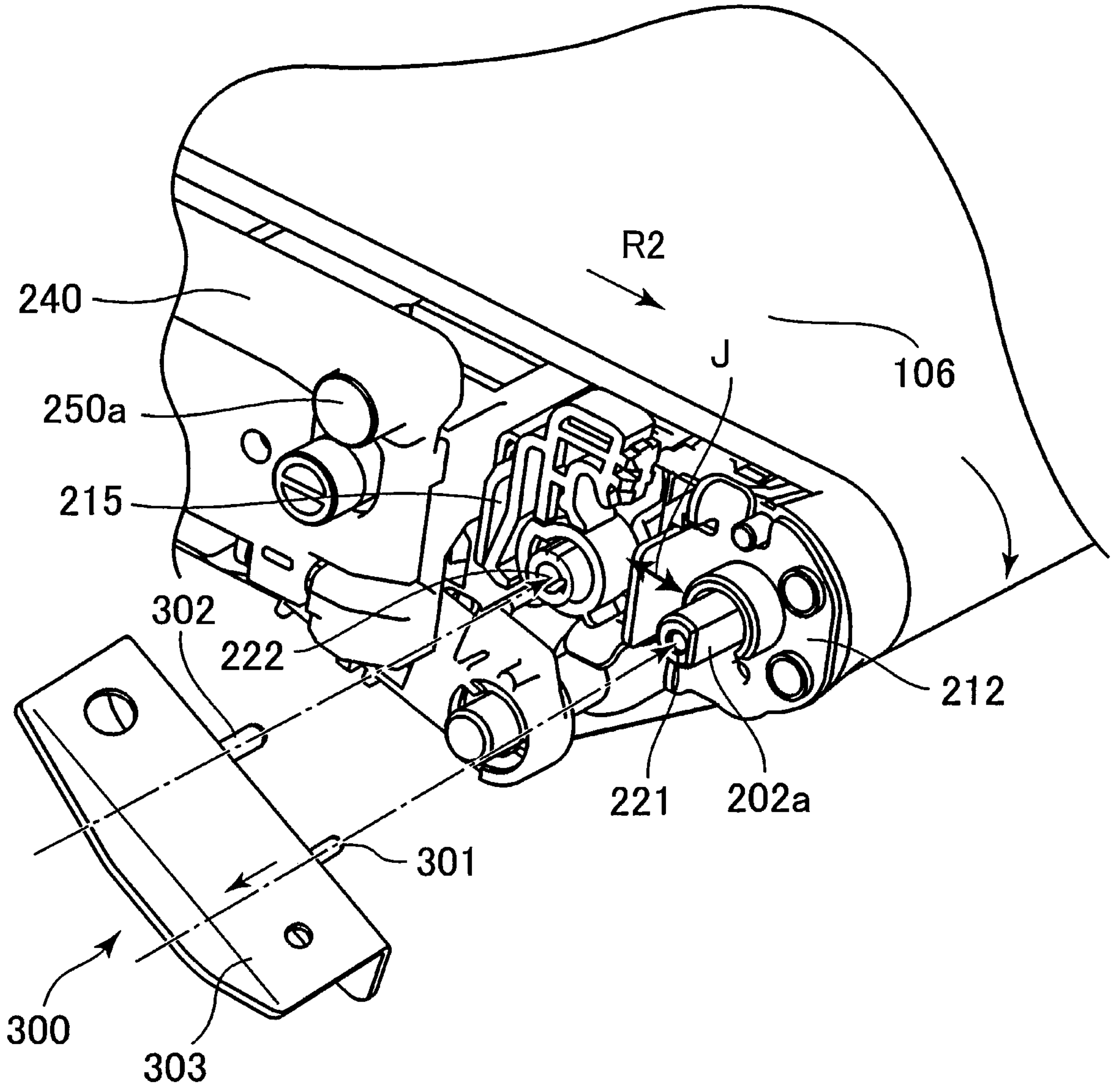
FIG. 13 is a perspective view illustrating a tension loosening member and a vicinity of a portion, on which the tension loosening member is mounted, in the unit main assembly.
Figure 14:
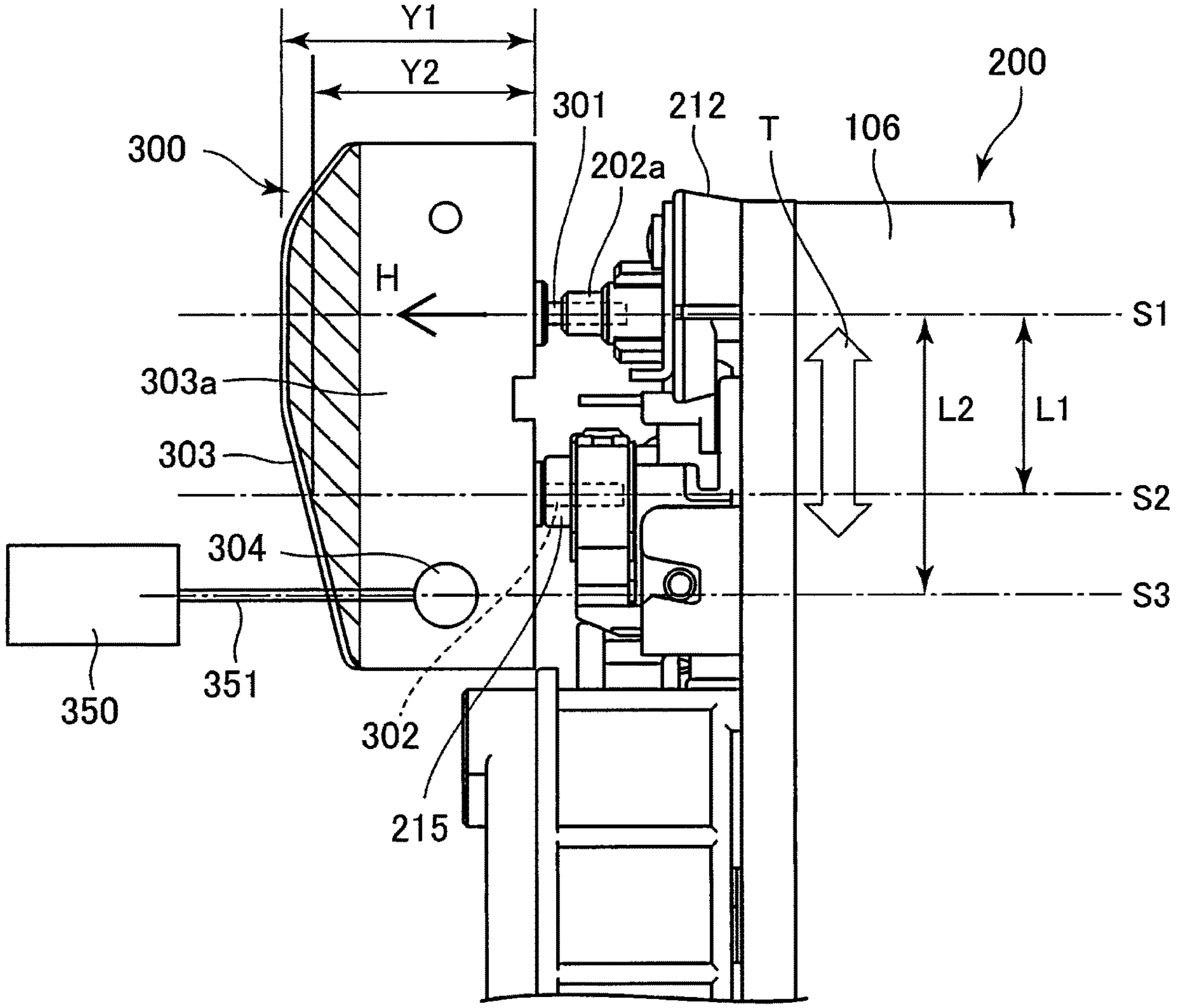
FIG. 14 is a plan view of a vicinity of the tension loosening member mounted on the unit main assembly as viewed from above.

Next, an example of preferred settings for each portion of the tension loosening member 300 in the present Embodiment will be further described. FIG. 13 is a perspective view illustrating the tension loosening member 300 in the present Embodiment and a vicinity of a portion, on which the tension loosening member 300 is mounted, in the unit main assembly 220. In FIG. 13, the tension loosening member 300 which is about to be mounted on the rear side of unit main assembly 220 is illustrated. In addition, FIG. 14 is a plan view of a vicinity of the tension loosening member 300 in the state of being mounted on the unit main assembly 220 in the present Embodiment as viewed from above. In FIG. 14, the tension loosening member 300 mounted on a front side of the unit main assembly 220 is illustrated.

As shown in FIG. 14, in the state in which the tension loosening member 300 is mounted on the unit main assembly 220, to the first shaft portion 301 and the second shaft portion 302, force in a direction widening a gap between these two shafts is exerted due to the tension T applied by the tension spring 214. Therefore, even if the tension loosening member 300 is pulled in parallel with axial directions of the first shaft portion 301 and the second shaft portion 302, both two holes (the first mounting hole 221 and the second mounting hole 222) will be forced to be oblique with respect to these two shafts. At this time, in a case in which two sets of the first mounting hole 221 and the first shaft portion 301 and the second mounting hole 222 and the second shaft portion 302 have fitting relationship with no play, the two holes and the two shafts are in gnawing relationship (state in which contact pressure between the shaft and an inner wall of the hole gets higher). Therefore, it becomes difficult to pull the first shaft portion 301 and the second shaft portion 302 out of the first mounting hole 221 and the second mounting hole 222. Conversely, in a case in which the relationship between the two sets of the shafts and the holes both have engaging relationship with play, the holes will be able to tilt somewhat significantly with respect to the shafts. Therefore, it becomes easier to pull the first shaft portion 301 and the second shaft portion 302 out of the first mounting hole 221 and the second mounting hole 222, such as by reducing contacting areas between the shafts and the inner walls of the holes. In this case, however, there is a risk that the first shaft portion 301 and the second shaft portion 302 may unintentionally exit from the first mounting hole 221 and the second mounting hole 222 due to shocks caused by vibration, dropping or the like during the transportation, etc. of the intermediary transfer unit 200 as a consumable part.

Therefore, in the present Embodiment, one of the two sets of the shafts and the holes is configured to have the fitting relationship with no play, and the other is configured to have the engaging relationship with play. Specifically, in the present Embodiment, the first shaft portion 301 and the first mounting hole 221 are configured to have the fitting relationship with no play, and the second shaft portion 302 and the second mounting hole 222 are configured to have the engaging relationship with play. By this, it becomes unlikely for the first shaft portion 301 and the second shaft portion 302 to exit from the first mounting hole 221 and the second mounting hole 222, even in the case in which the shocks from vibration, dropping or the like during the transportation, etc. In the fitting relationship with no play, an inner diameter of the hole is preferably +0 μm or more and +100 μm or less, and more preferably +0 μm or more and +80 μm or less with respect to an outer diameter of the shaft. In addition, in the engaging relationship with play, the inner diameter of the hole is preferably +100 μm or more and +500 μm or less, and more preferably +300 μm or more and +500 μm or less with respect to the outer diameter of the shaft. As an example, in the present Embodiment, an outer diameter of the first shaft portion 301 is 2f9 (from 1.969 to 1.994) mm and a length thereof is 5.5 mm, and an outer diameter of the second shaft portion 302 is 2.8f9 (from 2.769 to 2.794) mm and a length thereof is 7 mm. Correspondingly, an inner diameter of the first mounting hole 221 is 2H10 (from 2.00 to 2.04) mm and a length thereof is 7 mm, and an inner diameter of the second mounting hole 222 is 3.2 mm and a length thereof is 8.8 mm. Incidentally, it may be configured that the first shaft portion 301 and the first mounting hole 221 has the engaging relationship with play, and the second shaft portion 302 and the second mounting hole 222 has the fitting relationship with no play.

In a case in which the two sets of the shafts and the holes are configured to have the relationship as described above, it is preferable to do the following upon dismounting the tension loosening member 300 from the unit main assembly 220. That is, the worker holds the first portion (handle portion) 303*a* of the base plate 303 on an axis S1 of the first shaft portion 301, which is configured to have the fitting relationship with no play, and pulls the first portion 303*a* substantially in parallel with the axis S1 of the first shaft portion 301 (substantially in parallel with the rotational axis direction of the tension roller 202) as shown by an arrow H in FIG. 14. By this, it becomes easier to pull the first shaft portion 301 and the second shaft portion 302 out of the first mounting hole 221 and the second mounting hole 222, since the first shaft portion 301 and the first mounting hole 221 are not tilted but the second mounting hole 222 is tilted with respect to the second shaft portion 302. In this case, it is preferable to set a shape, etc. of a portion of the tension loosening member 300, with which the worker operates, so that the worker can see that the tension loosening member 300 is pulled out with holding on the first shaft portion 301 side, which is configured to have the fitting relationship with no play. In the present Embodiment, a width of the first portion 303*a* of the base plate 303 in the rotational axis direction of the tension roller 202 is set as follows. That is, a width Y1 on the axis S1 of the first shaft portion 301, which is configured to have the fitting relationship with no play, is set larger than a width Y2 on an axis S2 of the second shaft portion 302, which is configured to have the engaging relationship with play (Y1>Y2). As a result, a space in the first portion 303*a* of the base plate 303 for the worker's fingers to grip is configured to be larger on the axis S1 of the first shaft portion 301 than on the axis S2 of the second shaft portion 302. As a result, it becomes possible for the worker to intuitively grip the larger space and easier for the worker to dismount the tension loosening member 300 from the unit main assembly 220. In addition, in the present Embodiment, in the first portion 303*a* of the base plate 303, a portion of an end portion (shaded portion) on a downstream side in a pulling direction H of the tension loosening member 300 from the unit main assembly 220 (outside of the intermediary transfer unit 200) is configured to have a shape warped upward. By this, it becomes further easier for the worker to dismount the tension loosening member 300 from the unit main assembly 220.

In addition, an attention attracting label 350 as an attention attracting member can be mounted on the tension loosening member 300 to prevent the worker from forgetting to dismount the tension loosening member 300. The attention attracting label 350 is mounted on the tension loosening member 300 by a string 351 as a mounting means. In other words, the attention attracting label 350 is tied by one end portion of the string 351 in an elongated direction, and the tension loosening member 300, which is a component to be dismounted from the unit main assembly 220, is tied by the other end of the string 351 in the elongated direction. The string 351 may be configured to have a color which is easily visible to the worker, such as red or orange. And the attention attracting label 350 is then affixed to a conspicuous place for the worker in order to make the tension loosening member 300 easily be noticed. In order to make it conspicuous for the worker, there may be a case in which the string 351 is long. In a case in which the tension loosening member 300 is dismounted from the unit main assembly 220 by the worker pulling the string 351, the tension loosening member 300 may touch the unit main assembly 220 (e.g., intermediary transfer belt 106), etc. by the string 351 being swung around with the tension loosening member 300 still being tied to the one end of the string 351, etc. Therefore, it is preferable that the tension loosening member 300 not be easily dismounted from the unit main assembly 220 even if the worker pulls the string 351. Then, in the present Embodiment, a position of an attention attracting member mounting hole 304 as an attention attracting member mounting portion for mounting the string 351 in the tension loosening member 300 is set as follows. That is, in a direction substantially perpendicular to the axial directions of the first shaft portion 301 and the second shaft portion 302, a distance L2 from the axis S1 to a straight line S3, which is passing through the attention attracting member mounting hole 304 and substantially parallel to the axis S1 and the axis S2, is configured to be greater than a distance L1 from the axis S1 of the first shaft portion 301, which is configured to have the fitting relationship with no play, to the axis S2 of the second shaft portion 302, which is configured to have the engaging relationship with play, (L2>L1). However, the straight line S3 is on the same side as the axis S2 with respect to the axis S1. By this, it becomes difficult for the tension loosening member 300 to come off the unit main assembly 220 since, when the string 351 is pulled, the first shaft portion 301 and the first mounting hole 221 try to tilt, resulting in the gnawing relationship between the hole and the shaft.

Incidentally, in the present Embodiment, the tension loosening member 300 is configured to be dismounted from the unit main assembly 220, however, the present invention is not limited thereto. If the above-described relationship W2>W3 is satisfied in the state in which the tension of the intermediary transfer belt 106 is loosened and the above-described relationship W3>W1 is satisfied in the state in which the tension-loosened state of the intermediary transfer belt 106 is released, then it may be configured that the tension loosening member 300 is not dismounted from the unit main assembly 220 but remains in the intermediary transfer unit 200.

Figure 15:
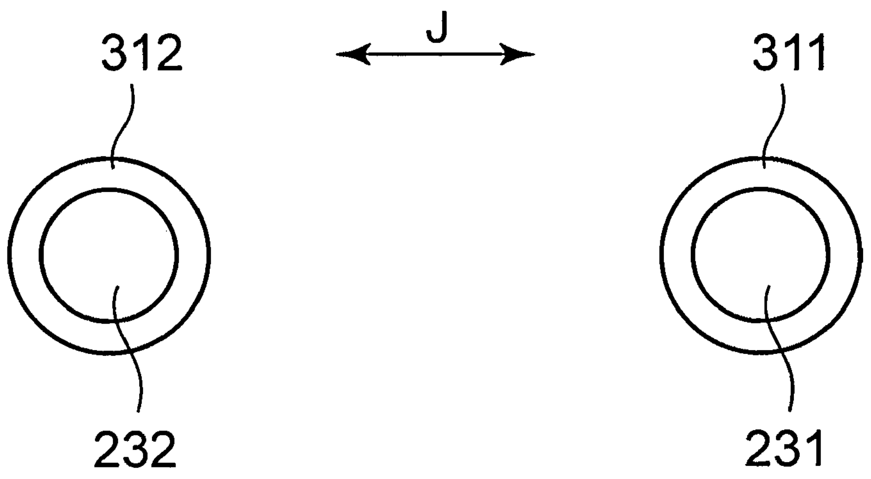
FIG. 15 is a schematic view illustrating another example of a first and a second engaging portions of the tension loosening member and a first and a second engaged portions of the unit main assembly.

In addition, in the present Embodiment, the shafts as the first engaging portion and the second engaging portion of the tension loosening member 300 are configured to be inserted into the holes as the first engaged portion and the second engaged portion of the unit main assembly 220, respectively, however, the present invention is not limited thereto. In addition, the first engaged portion of the unit main assembly 220 is not limited to being provided to the rotation shaft 202*a* of the tension roller 202, but may be provided to, for example, the bearing member 212, etc. FIG. 15 is a schematic side view illustrating another example of the first engaging portion and the second engaging portion of the tension loosening member 300 and the first engaged portion and the second engaged portion of the unit main assembly 220 as viewed along the rotational axis direction of the tension roller 202. In the example shown in FIG. 15, the first engaged portion 231 and the second engaged portion 232 of the unit main assembly 220 are constituted by projections having cylindrical shape provided to the bearing member 212 of the tension roller 202 and the urging and supporting member 215, respectively. In addition, in the example of FIG. 15, the first engaging portion 311 and the second engaging portion 312 of the tension loosening member 300 are formed by projections having hollow cylindrical shape, which engage with the first engaged portion 231 and the second engaged portion 232 from outside thereof, respectively. The projections constituting the first engaged portion 231 and the second engaged portion 232 of the unit main assembly 220 are not limited to the cylindrical shape, but may be a rib shape (plate shape), a square prism shape, or other shapes. In addition, the first engaging portion 311 and the second engaging portion 312 of the tension loosening member 300 are not limited to the cylindrical shape, but may be, for example, a projection of which a cross-section has a circular arc shape, a rib shape (plate shape), a square cylindrical shape, or other shapes.

10. Effects

Thus, in the present Embodiment, the belt conveyance device (intermediary transfer unit) 200 dismountably mounted on the mounting portion 150 provided to the image forming apparatus 100 includes the endless belt (intermediary transfer belt) 106, the plurality of the stretching rollers which stretch the belt 106 and include the tension roller 202, the urging member (tension spring) 214 which applies the tension to the belt 106 by urging the tension roller 202, the supporting member (urging and supporting member) 215 which supports the urging member 214, and the tension loosening member 300 which loosens the tension applied to the belt 106 from a first tension to a second tension which is smaller than the first tension. In addition, in the present Embodiment, the tension loosening member 300 includes the first engaging portion 301 engageable with the first engaged portion 221 together with the tension roller 202 relatively movable to the supporting member 215 and the second engaging portion 302 engageable with the second engaged portion 222 together with the supporting member 215 relatively movable to the tension roller 202, and is capable of positioning the tension roller 202 in a first position, where it is permitted that the first tension is applied to the belt 106, by the engagement with the first and the second engaging portions 301 and 302 and the first and the second engaged portions 221 and 222 being released, and is capable of positioning the tension roller 202 in a second position, where the tension applied to the belt 106 is set to the second tension, by engaging the first and the second engaging portions 301 and 302 with the first and the second engaged portions 221 and 222. And in the present Embodiment, in the belt conveyance device 200, when the maximum width of the belt conveyance device 200 in the rotational axis direction of the tension roller 202 when the tension roller 202 is in the first position by the engagement with the first and the second engaging portions 301 and 302 and the first and the second engaged portions 221 and 222 being released is defined as W1, the maximum width of the belt conveyance device 200 in the rotational axis direction of the tension roller 202 when the tension roller 202 is in the second position by the first and the second engaging portions 301 and 302 engaging with the first and the second engaged portions 221 and 222 is defined as W2, and the maximum width of the mounting portion 150 in the rotational axis direction of the tension roller 202 is defined as W3, the relationship of W2>W3>W1 is satisfied, and when the tension roller 202 is in the second position by the first and the second engaging portions 301 and 302 engaging with the first and the second engaged portions 221 and 222, the belt conveyance device 200 cannot be mounted on the mounting portion 150. In the present Embodiment, the tension loosening members 300 are provided on both end portion sides in the widthwise direction of the belt 106, respectively, and the width W2 is the distance between the end portions of the tension loosening members 300 on both end portion sides. In addition, in the present Embodiment, the tension loosening members 300 are mounted on the main assembly 220 of the belt conveyance device 200 by engaging the first and the second engaging portions 301 and 302 with the first and the second engaged portions 221 and 222, and are dismounted from the main assembly 220 of the belt conveyance device 200 by releasing the engagement of the first and the second engaging portions 301 and 302 with the first and the second engaged portions 221 and 222.

In particular, in the present Embodiment, the first engaged portion, the second engaged portion, the first engaging portion and the second engaging portion are constituted by the first mounting hole 221 provided along the rotational axis direction of the tension roller 202, the second mounting hole 222 provided along the rotational axis direction of the tension roller 202, the first shaft portion 301 insertable into the first mounting hole 221 and the second shaft portion 302 insertable into the second mounting hole 222, respectively, and the tension roller 202 is positioned in the second position by the first shaft portion 301 being inserted into the first mounting hole 221 and the second shaft portion 302 being inserted into the second mounting hole 222 and the tension roller 202 is positioned in the first position by the first shaft portion 301 being pulled out from the first mounting hole 221 and the second shaft portion 302 being pulled out from the second mounting hole 222. In the present Embodiment, the first mounting hole 221 is provided on the rotation shaft **202*a* of the tension roller 202. In addition, in the present Embodiment, the second mounting hole 222 is provided on the supporting member 215. In addition, in the present Embodiment, the axis of the first shaft portion 301 and the axis of the second shaft portion 302 are substantially parallel with each other, and one of the first shaft portion 301 and the first mounting hole 221 and the second shaft portion 302 and the second mounting hole 222 has the fitting relationship with no play and the other has the engaging relationship with play. Here, in the present Embodiment, the tension loosening member 300 includes the handle portion 303*a* which is operable when the first and the second shaft portions 301 and 302 are pulled out from the first and the second mounting holes 221 and 222. In this case, when an axis of one, of the first shaft portion 301 and the second shaft portion 302, which has the fitting relationship with no play, is defined as the axis S1, an axis of the other is defined as the axis S2, the width of the handle portion 303*a* on the axis S1 in the rotational axis direction of the tension roller 202 is defined as Y1 and the width on the axis S2 in the rotational axis direction of the tension roller 202 is defined as Y2, the relationship of Y1>Y2 is preferably satisfied. In addition, in the present Embodiment, the tension loosening member 300 includes the attention attracting member mounting portion 304 on which the attention attracting member 350 is mounted. In this case, when the axis of one, of the first shaft portion 301 and the second shaft portion 302, which has the fitting relationship with no play, is defined as the axis S1, the axis of the other is defined as the axis S2, the straight line passing through the attention attracting member mounting portion 304** and substantially parallel to the axis S1 is defined as S3, the distance from the axis S1 to the axis S2 in the direction substantially perpendicular to the axis S1 is defined as L1 and the distance from the axis S1 to the straight line S3 in the direction substantially perpendicular to the axis S1 is defined as L2, the straight line S3 exists on the same side as the axis S2 with respect to the axis S1 and the relationship of L1<L2 is preferably satisfied.

In addition, in the present Embodiment, the length of the urging member 214 in the extending and contracting direction thereof is constant in the case in which the first and the second engaging portions 301 and 302 engage with the first and the second engaged portions 221 and 222. In addition, in the present Embodiment, of the plurality of stretching rollers, the tension roller 202 is positioned downstreammost in the mounting direction of the belt conveyance device 200 to the mounting portion 150. In addition, in the present Embodiment, the belt conveyance device 200 includes the support receiving portion 250 for being supported by the rail provided on the mounting portion 150, and the tension loosening member 300 is provided downstream of the support receiving portion 250 in the mounting direction of the belt conveyance device 200 to the mounting portion 150. In addition, in the present Embodiment, the belt 106 is the intermediary transfer member to which the toner image formed in the image forming portion S provided to the image forming apparatus 100 is transferred.

As described above, according to the present Embodiment, it becomes possible to prevent the intermediary transfer unit 200 from being mounted on the apparatus main assembly 120 with forgetting to release the state in which the tension of the intermediary transfer belt 106 is loosened.

Others

As described above, the present invention has been described according to the specific Embodiments, however, the present invention is not limited to the above Embodiments.

In the Embodiments described above, the number of the image forming portions is four, however, it is not limited to this number, but may be more or less. In addition, an order of the image forming portions for each color also is not limited to what described in the Embodiments above.

In addition, in the Embodiments described above, the intermediary transfer belt is stretched by the four stretching rollers, however, the number of the stretching rollers for stretching the intermediary transfer belt is not limited thereto, but may be more or less.

In addition, in the Embodiments described above, the tension roller has the function of the steering roller, however, the tension roller does not have to have this function. In this case, for example, it is configured that the bearing member of the tension roller is movably supported by the urging and supporting member provided to a frame corresponding to the first frame in the Embodiments described above. In addition, in this case, a stretching roller other than the tension roller among the plurality of the stretching rollers of the intermediary transfer unit may have the function of the steering roller.

In addition, in the Embodiments described above, the belt conveyance device is what conveys the intermediary transfer belt, however, the present invention is not limited to such Embodiments. For example, an image forming apparatus of direct transfer type which includes a recording material carrying belt constituted by an endless belt as a recording material carrying member which carries and conveys the recording material onto which the toner image formed on the image bearing member such as the photosensitive member is transferred is known to those having ordinal skills in the art. The present invention can also be applied to the belt conveyance device which conveys this recording material carrying belt. Other than that, the present invention may be applied to a belt conveyance device which conveys a photosensitive member belt or an electrostatic recording dielectric belt as an image bearing member, a belt as a rotatable heating member or a rotatable pressing member provided to an image heating device such as the fixing device which heats the recording material, or other belts.

According to the present invention, it becomes possible to prevent the belt conveyance device from being mounted on the main assembly of the image forming apparatus with forgetting to release the state in which the tension of the belt is loosened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-196322 filed on Nov. 18, 2023, which is hereby incorporated by reference herein in its entirety.

What is claimed is:

1. An image forming apparatus comprising:

an image forming portion configured to form an image;

a belt unit dismountably mounted on a main assembly of the image forming apparatus, wherein the belt unit includes:

an endless belt to which a toner image formed in the image forming portion is transferred;

a tension mechanism capable of applying a tension to the belt and including a tension roller configured to apply the tension to the belt by stretching the belt and movably provided between a first position where the tension is applied to the belt and a second position where the tension of the belt is released or the tension of the belt is loosened more than when the tension roller is positioned in the first position, and an urging member configured to urge the tension roller;

an engaged portion provided on the tension mechanism and configured to be engaged with a tension releasing member configured to restrict movement of the tension roller from the second position to the first position, wherein the tension releasing member permits the movement of the tension roller from the second position to the first position by engagement with the tension mechanism being released; and a contacted portion provided on the main assembly of the image forming apparatus and configured to prevent the belt unit from being mounted by the tenson releasing member being contacted when the belt unit is to be mounted in a state in which the tension releasing member is engaged with the tension mechanism.

2. The image forming apparatus according to claim 1, wherein when a maximum width of the belt unit in a predetermined direction when the tension releasing member is not mounted on the belt unit is defined as W1, a maximum width of the belt unit in the predetermined direction when the tension releasing member is mounted on the belt unit is defined as W2, and a maximum width of an inlet, of a mounting portion in the image forming apparatus, for the belt unit with respect to the predetermined direction is defined as W3, the following relationship is satisfied:

$W2>W3>W1$.

3. The image forming apparatus according to claim 2, wherein the tension releasing members are mounted on both end portion sides of the belt unit in a widthwise direction of the belt, and wherein the width W2 is a distance between end portions of the tension releasing member on the both end portion sides.

4. The image forming apparatus according to claim 1, further comprising a supporting member configured to support the urging member, wherein the tension releasing member includes a first engaging portion engageable with a first engaged portion together with the tension roller relatively movable to the supporting member and a second engaging portion engageable with a second engaged portion together with the supporting member relatively movable to the tension roller, and the movement of the tension roller from the second position to the first position is permitted by the engagement with the first and the second engaging portions and the first and the second engaged portions being released and the movement of the tension roller from the second position to the first position is restricted by the first and the second engaging portions engaging with the first and the second engaged portions.

5. The image forming apparatus according to claim 4, wherein the tension releasing members are mounted on a main assembly of the belt unit by engaging the first and the second engaging portions with the first and the second engaged portions, and are dismounted from the main assembly of the belt unit by releasing the engagement of the first and the second engaging portions with the first and the second engaged portions.

6. The image forming apparatus according to claim 4, wherein the first engaged portion, the second engaged portion, the first engaging portion and the second engaging portion are constituted by a first mounting hole provided along a rotational axis direction of the tension roller, a second mounting hole provided along the rotational axis direction of the tension roller, a first shaft portion insertable into the first mounting hole and a second shaft portion insertable into the second mounting hole, respectively, and the tension roller is positioned in the second position by the first shaft portion being inserted into the first mounting hole and the second shaft portion being inserted into the second mounting hole and the tension roller is positioned in the first position by the first shaft portion being pulled out from the first mounting hole and the second shaft portion being pulled out from the second mounting hole.

7. The image forming apparatus according to claim 6, wherein the first mounting hole is provided on a rotation shaft of the tension roller.

8. The image forming apparatus according to claim 6, wherein the second mounting hole is provided on the supporting member.

9. The image forming apparatus according to claim 6, wherein an axis of the first shaft portion and an axis of the second shaft portion are substantially parallel with each other, and one of the first mounting hole of the first shaft portion and the second mounting hole of the second shaft portion has a fitting relationship with no play and the other has an engaging relationship with play.

10. The image forming apparatus according to claim 9, wherein the tension releasing member includes a handle portion which is operable when the first and the second shaft portions are pulled out from the first and the second mounting holes, and when an axis of one, of the first shaft portion and the second shaft portion, which includes the fitting relationship with no play, is defined as an axis S1, an axis of the other is defined as an axis S2, a width of the handle portion on the axis S1 in the rotational axis direction of the tension roller is defined as Y1 and a width on the axis S2 in the rotational axis direction of the tension roller is defined as Y2, the following relationship is satisfied:

$Y1>Y2$.

11. The image forming apparatus according to claim 9, wherein the tension releasing member includes an attention attracting member mounting portion on which an attention attracting member is mounted, and when an axis of one, of the first shaft portion and the second shaft portion, which includes the fitting relationship with no play, is defined as an axis S1, an axis of the other is defined as an axis S2, a straight line passing through the attention attracting member mounting portion and substantially parallel to the axis S1 is defined as S3, a distance from the axis S1 to the axis S2 in a direction substantially perpendicular to the axis S1 is defined as L1 and a distance from the axis S1 to the straight line S3 in the direction substantially perpendicular to the axis S1 is defined as L2, the straight line S3 exists on the same side as the axis S2 with respect to the axis S1 and the following relationship is satisfied:

$L1<L2$.

12. The image forming apparatus according to claim 4, wherein a length of the urging member in an extending and contracting direction thereof is constant in a case in which the first and the second engaging portions engage with the first and the second engaged portions.

13. The image forming apparatus according to claim 1, further comprising a plurality of stretching rollers, including the tension roller, configured to stretch the belt, wherein of the plurality of the stretching rollers, the tension roller is positioned downstreammost in a mounting direction of the belt unit to the main assembly of the image forming apparatus.

14. The image forming apparatus according to claim 1, further comprising a rail provided on the main assembly of the image forming apparatus and configured to guide the belt unit to a mounting position, wherein the belt unit includes a support receiving portion configured to be supported by the rail, and wherein the tension releasing member is provided downstream of the support receiving portion in a mounting direction of the belt unit to the main assembly of the image forming apparatus.

15. The image forming apparatus according to claim 1, wherein the tension releasing member is provided with a first tension releasing member engageable with the tension mechanism at one end side of the belt unit in a widthwise direction of the belt and a second tension releasing member engageable with the tension mechanism at the other end side in the widthwise direction of the belt, wherein the contacted portion is provided with a first contacted portion configured to prevent the belt unit from being mounted by the first tension releasing member being contacted and a second contacted portion configured to prevent the belt unit from being mounted by the second tension releasing member being contacted, and wherein the first contacted portion prevents the belt unit from being mounted by the first tension releasing member being contacted when the belt unit is to be mounted in a state in which the first tension releasing member is engaged and the engagement of the second tension releasing member is released.

16. A belt unit dismountably mounted on a main assembly of an image forming apparatus, the belt unit comprising:

an endless belt;

a tension mechanism capable of applying a tension to the belt and including a tension roller configured to apply the tension to the belt by stretching the belt and movably provided between a first position where the tension is applied to the belt and a second position where the tension of the belt is released or the tension of the belt is loosened more than when the tension roller is positioned in the first position, and an urging member configured to urge the tension roller;

a tension releasing member configured to restrict movement of the tension roller from the second position to the first position and permit the movement of the tension roller from the second position to the first position by engagement with the tension mechanism being released; and a contacting portion provided on the tension releasing member configured to prevent the belt unit from being mounted on the main assembly of the image forming apparatus when the belt unit is to be mounted in a state in which the tension releasing member is engaged with the tension mechanism.

* * * * *